(12) United States Patent
Min et al.

(10) Patent No.: US 11,175,873 B2
(45) Date of Patent: Nov. 16, 2021

(54) DISPLAY APPARATUS AND CONTROLLING METHOD THEREOF

(71) Applicant: SAMSUNG ELECTRONICS CO., LTD., Suwon-si (KR)

(72) Inventors: Hyunsuk Min, Suwon-si (KR); Changgun Ko, Suwon-si (KR); Seokho Ban, Suwon-si (KR); Donghoon Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/017,097

(22) Filed: Sep. 10, 2020

(65) Prior Publication Data

US 2021/0072941 A1 Mar. 11, 2021

(30) Foreign Application Priority Data

Sep. 10, 2019 (KR) .................. 10-2019-0112127

(51) Int. Cl.
*G08B 17/00* (2006.01)
*G06F 3/14* (2006.01)
(Continued)

(52) U.S. Cl.
CPC .............. *G06F 3/14* (2013.01); *G08B 21/182* (2013.01); *G06F 3/044* (2013.01); *G06F 3/045* (2013.01); *G06F 3/0428* (2013.01)

(58) Field of Classification Search
CPC .......... G06F 3/14; G06F 3/0428; G06F 3/044; G06F 3/045; G06F 11/3058;
(Continued)

(56) References Cited

U.S. PATENT DOCUMENTS 4,882,564 A 11/1989 Monroe et al.
2009/0012374 A1 1/2009 Schmelzeisen-Redeker et al.
(Continued)

FOREIGN PATENT DOCUMENTS

KR 10-2016-0076454 A 6/2016
KR 10-1860015 B1 5/2018
(Continued)

OTHER PUBLICATIONS

Communication dated Feb. 1, 2021 issued by the European Patent Office in European Application No. 20194131.7.
(Continued)

*Primary Examiner* — Anh V La
(74) *Attorney, Agent, or Firm* — Sughrue Mion, PLLC

(57) ABSTRACT

Provided is a display apparatus. The display apparatus includes at least one component; a storage configured to store at least one rule to diagnose the at least one component; and a controller configured to: acquire operation data of the at least one component, output at least one of a warning related to the at least one component or an error related to the at least one component based on a result of applying the operation data to the at least one rule, acquire at least one of installation environment data of the display apparatus or operating environment data of the display apparatus, and update the at least one rule based on the at least one of the installation environment data or the operating environment data.

18 Claims, 14 Drawing Sheets

(51) Int. Cl.
    *G08B 21/18*     (2006.01)
    *G06F 3/042*     (2006.01)
    *G06F 3/044*     (2006.01)
    *G06F 3/045*     (2006.01)

(58) Field of Classification Search
    CPC ... G06F 11/3055; G08B 21/182; G09G 3/006; G09G 2330/04; G09G 2330/045; G09G 2320/041; G09G 2320/029; G09G 2330/12; G09G 2320/06; G01K 3/005
    USPC ............ 340/584, 573.1, 568.8, 691.1, 691.6, 340/693.5, 815.4, 815.45
    See application file for complete search history.

(56) References Cited

U.S. PATENT DOCUMENTS

| | | | |
|---|---|---|---|
| 2010/0100521 A1 | 4/2010 | Fujimaki et al. | |
| 2011/0095899 A1 | 4/2011 | Saito et al. | |
| 2013/0282154 A1* | 10/2013 | Chappell | G08G 1/095 700/90 |
| 2014/0240377 A1 | 8/2014 | Matsui | |
| 2015/0331772 A1 | 11/2015 | Tallam et al. | |
| 2016/0321125 A1* | 11/2016 | Kang | G06F 11/0706 |
| 2017/0205259 A1 | 7/2017 | Jang et al. | |
| 2018/0084599 A1 | 3/2018 | Dizengof | |
| 2018/0190378 A1 | 7/2018 | Takei | |
| 2018/0217683 A1* | 8/2018 | Kobayashi | G06F 3/041 |
| 2019/0065018 A1* | 2/2019 | Keam | G06F 15/16 |
| 2019/0139377 A1* | 5/2019 | Fayfield | G08B 5/36 |
| 2019/0195695 A1* | 6/2019 | Millhouse | G08B 13/14 |

FOREIGN PATENT DOCUMENTS

| | | | | |
|---|---|---|---|---|
| KR | 1020190048425 A | | 5/2019 | |
| WO | WO-2019088646 A1 | * | 5/2019 | ........... H04N 21/442 |

OTHER PUBLICATIONS

International Search Report dated Jan. 12, 2021 issued by the International Searching Authority in International Application No. PCT/KR2020/012110.

Communication dated May 12, 2021 by the European Patent Office in European Patent Application No. 20194131.7.

\* cited by examiner

FIG. 3

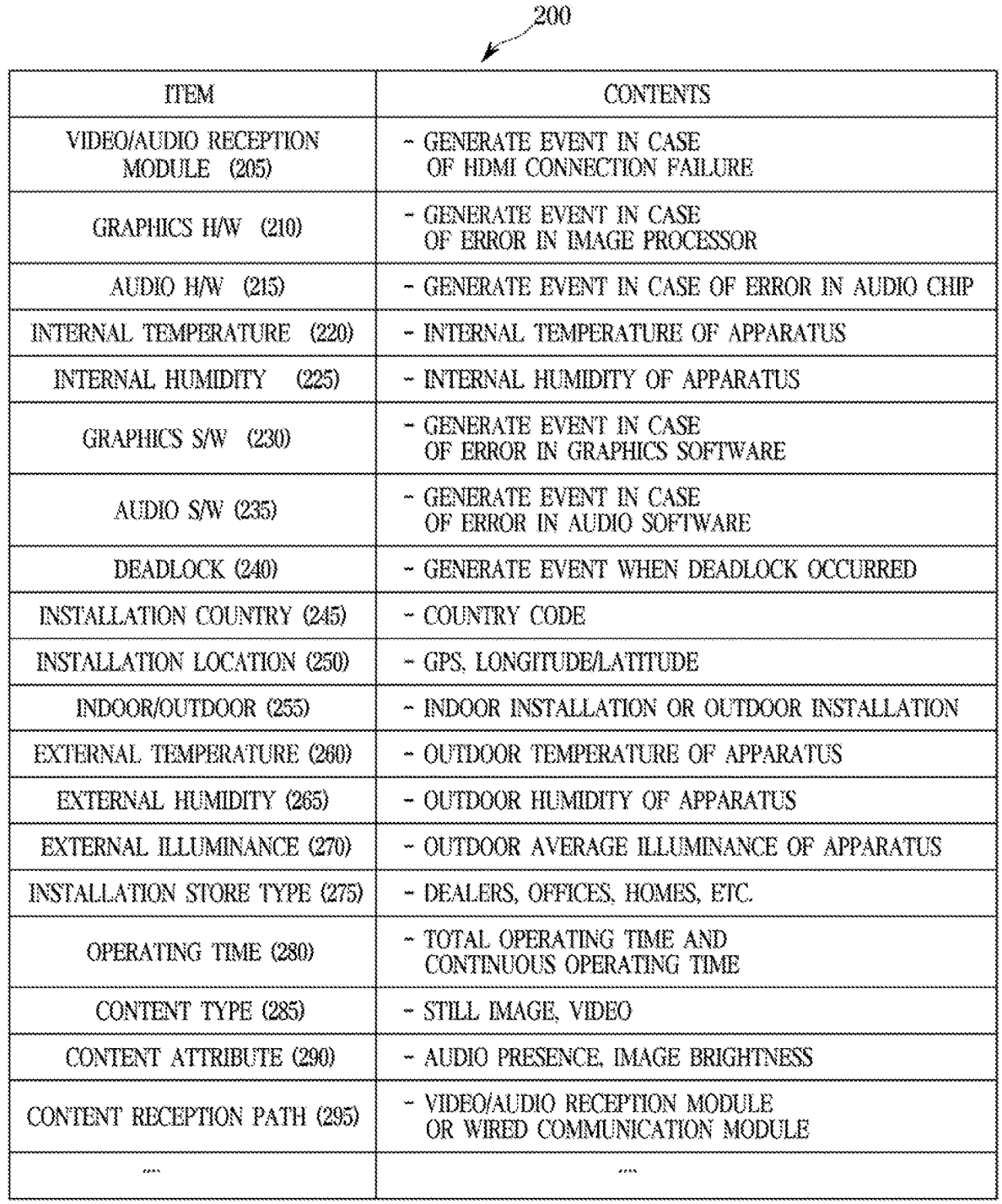

| ITEM | CONTENTS |
|---|---|
| VIDEO/AUDIO RECEPTION MODULE (205) | - GENERATE EVENT IN CASE OF HDMI CONNECTION FAILURE |
| GRAPHICS H/W (210) | - GENERATE EVENT IN CASE OF ERROR IN IMAGE PROCESSOR |
| AUDIO H/W (215) | - GENERATE EVENT IN CASE OF ERROR IN AUDIO CHIP |
| INTERNAL TEMPERATURE (220) | - INTERNAL TEMPERATURE OF APPARATUS |
| INTERNAL HUMIDITY (225) | - INTERNAL HUMIDITY OF APPARATUS |
| GRAPHICS S/W (230) | - GENERATE EVENT IN CASE OF ERROR IN GRAPHICS SOFTWARE |
| AUDIO S/W (235) | - GENERATE EVENT IN CASE OF ERROR IN AUDIO SOFTWARE |
| DEADLOCK (240) | - GENERATE EVENT WHEN DEADLOCK OCCURRED |
| INSTALLATION COUNTRY (245) | - COUNTRY CODE |
| INSTALLATION LOCATION (250) | - GPS, LONGITUDE/LATITUDE |
| INDOOR/OUTDOOR (255) | - INDOOR INSTALLATION OR OUTDOOR INSTALLATION |
| EXTERNAL TEMPERATURE (260) | - OUTDOOR TEMPERATURE OF APPARATUS |
| EXTERNAL HUMIDITY (265) | - OUTDOOR HUMIDITY OF APPARATUS |
| EXTERNAL ILLUMINANCE (270) | - OUTDOOR AVERAGE ILLUMINANCE OF APPARATUS |
| INSTALLATION STORE TYPE (275) | - DEALERS, OFFICES, HOMES, ETC. |
| OPERATING TIME (280) | - TOTAL OPERATING TIME AND CONTINUOUS OPERATING TIME |
| CONTENT TYPE (285) | - STILL IMAGE, VIDEO |
| CONTENT ATTRIBUTE (290) | - AUDIO PRESENCE, IMAGE BRIGHTNESS |
| CONTENT RECEPTION PATH (295) | - VIDEO/AUDIO RECEPTION MODULE OR WIRED COMMUNICATION MODULE |
| .... | .... |

FIG. 4

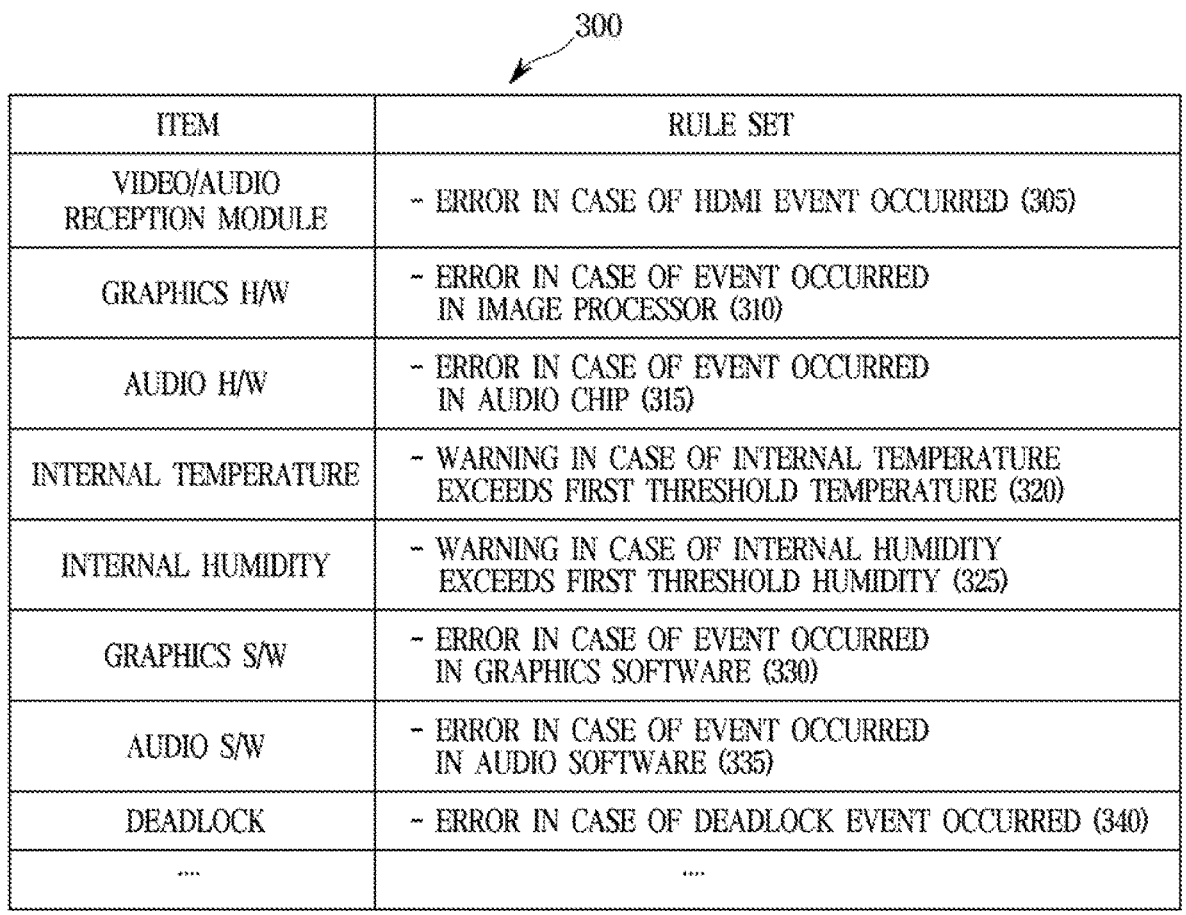

| ITEM | RULE SET |
|---|---|
| VIDEO/AUDIO RECEPTION MODULE | - ERROR IN CASE OF HDMI EVENT OCCURRED (305) |
| GRAPHICS H/W | - ERROR IN CASE OF EVENT OCCURRED IN IMAGE PROCESSOR (310) |
| AUDIO H/W | - ERROR IN CASE OF EVENT OCCURRED IN AUDIO CHIP (315) |
| INTERNAL TEMPERATURE | - WARNING IN CASE OF INTERNAL TEMPERATURE EXCEEDS FIRST THRESHOLD TEMPERATURE (320) |
| INTERNAL HUMIDITY | - WARNING IN CASE OF INTERNAL HUMIDITY EXCEEDS FIRST THRESHOLD HUMIDITY (325) |
| GRAPHICS S/W | - ERROR IN CASE OF EVENT OCCURRED IN GRAPHICS SOFTWARE (330) |
| AUDIO S/W | - ERROR IN CASE OF EVENT OCCURRED IN AUDIO SOFTWARE (335) |
| DEADLOCK | - ERROR IN CASE OF DEADLOCK EVENT OCCURRED (340) |
| .... | .... |

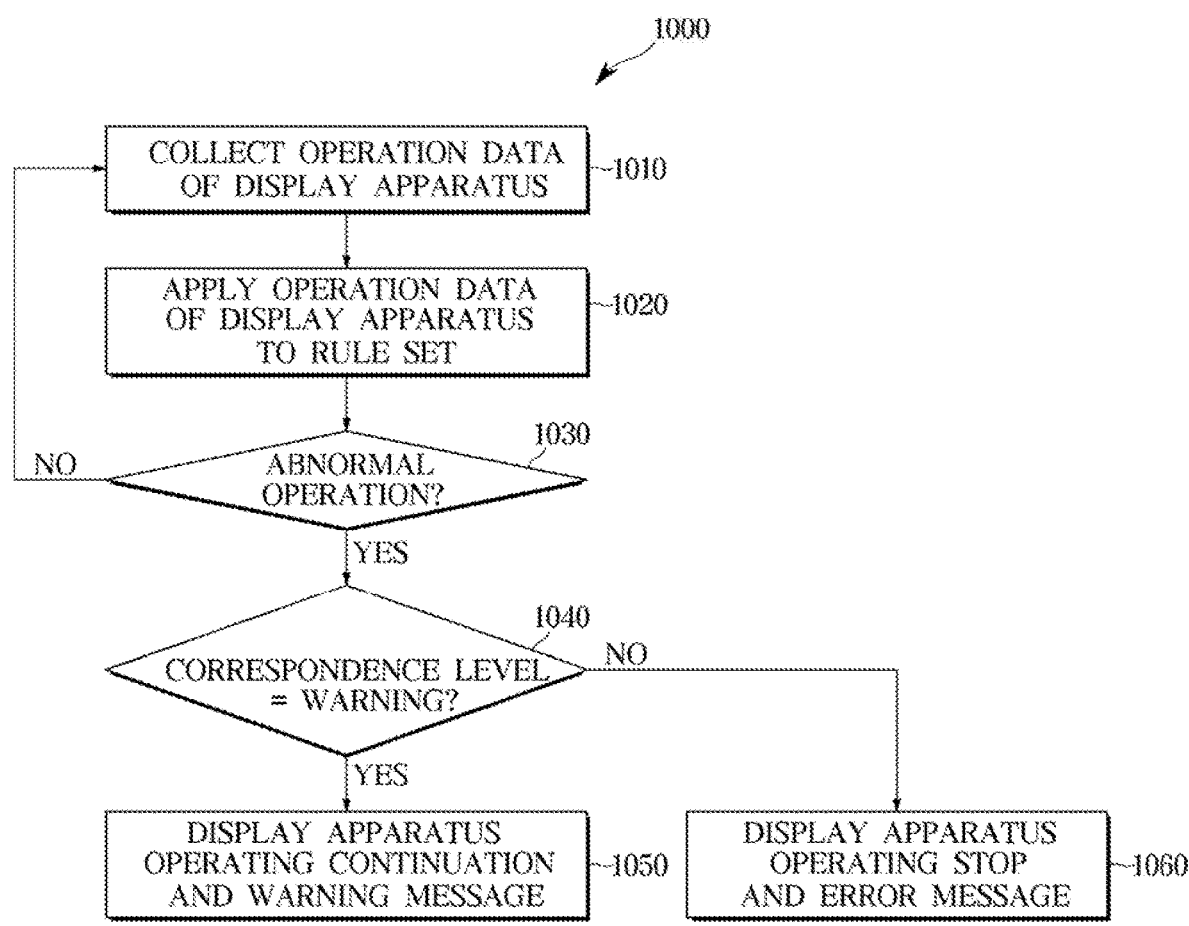

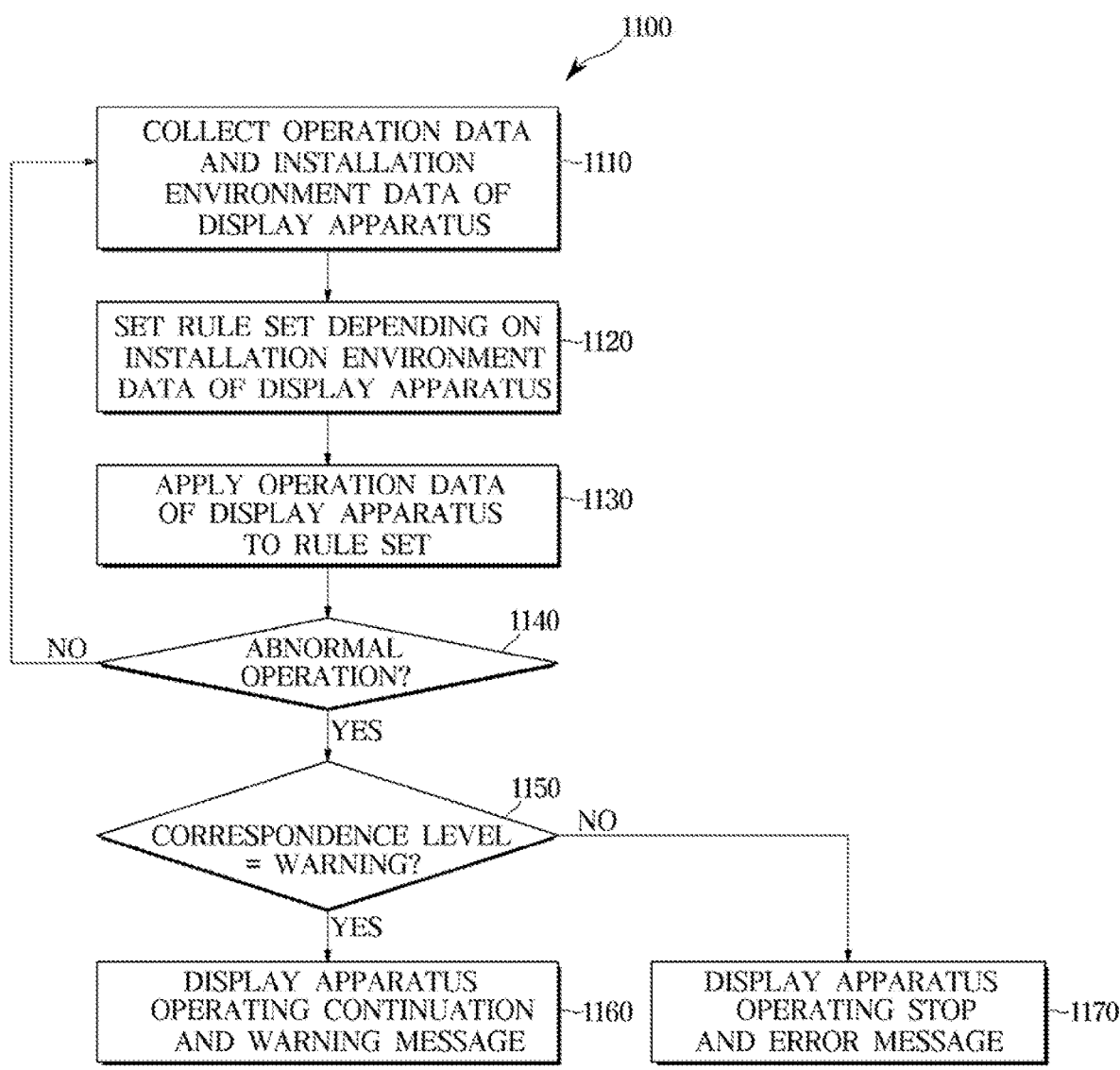

FIG. 7

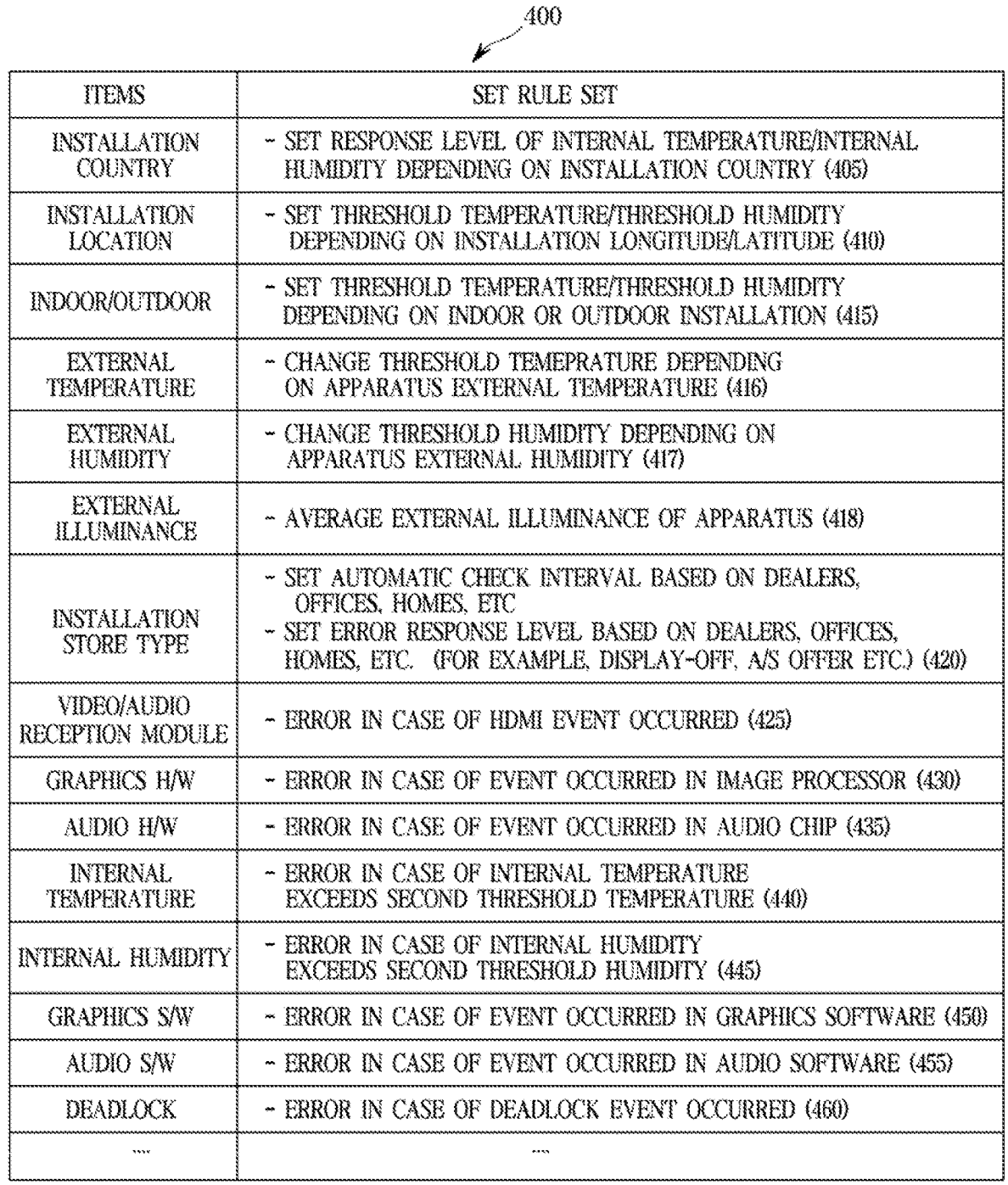

| ITEMS | SET RULE SET |
|---|---|
| INSTALLATION COUNTRY | - SET RESPONSE LEVEL OF INTERNAL TEMPERATURE/INTERNAL HUMIDITY DEPENDING ON INSTALLATION COUNTRY (405) |
| INSTALLATION LOCATION | - SET THRESHOLD TEMPERATURE/THRESHOLD HUMIDITY DEPENDING ON INSTALLATION LONGITUDE/LATITUDE (410) |
| INDOOR/OUTDOOR | - SET THRESHOLD TEMPERATURE/THRESHOLD HUMIDITY DEPENDING ON INDOOR OR OUTDOOR INSTALLATION (415) |
| EXTERNAL TEMPERATURE | - CHANGE THRESHOLD TEMEPRATURE DEPENDING ON APPARATUS EXTERNAL TEMPERATURE (416) |
| EXTERNAL HUMIDITY | - CHANGE THRESHOLD HUMIDITY DEPENDING ON APPARATUS EXTERNAL HUMIDITY (417) |
| EXTERNAL ILLUMINANCE | - AVERAGE EXTERNAL ILLUMINANCE OF APPARATUS (418) |
| INSTALLATION STORE TYPE | - SET AUTOMATIC CHECK INTERVAL BASED ON DEALERS, OFFICES, HOMES, ETC<br>- SET ERROR RESPONSE LEVEL BASED ON DEALERS, OFFICES, HOMES, ETC. (FOR EXAMPLE, DISPLAY-OFF, A/S OFFER ETC.) (420) |
| VIDEO/AUDIO RECEPTION MODULE | - ERROR IN CASE OF HDMI EVENT OCCURRED (425) |
| GRAPHICS H/W | - ERROR IN CASE OF EVENT OCCURRED IN IMAGE PROCESSOR (430) |
| AUDIO H/W | - ERROR IN CASE OF EVENT OCCURRED IN AUDIO CHIP (435) |
| INTERNAL TEMPERATURE | - ERROR IN CASE OF INTERNAL TEMPERATURE EXCEEDS SECOND THRESHOLD TEMPERATURE (440) |
| INTERNAL HUMIDITY | - ERROR IN CASE OF INTERNAL HUMIDITY EXCEEDS SECOND THRESHOLD HUMIDITY (445) |
| GRAPHICS S/W | - ERROR IN CASE OF EVENT OCCURRED IN GRAPHICS SOFTWARE (450) |
| AUDIO S/W | - ERROR IN CASE OF EVENT OCCURRED IN AUDIO SOFTWARE (455) |
| DEADLOCK | - ERROR IN CASE OF DEADLOCK EVENT OCCURRED (460) |
| .... | ... |

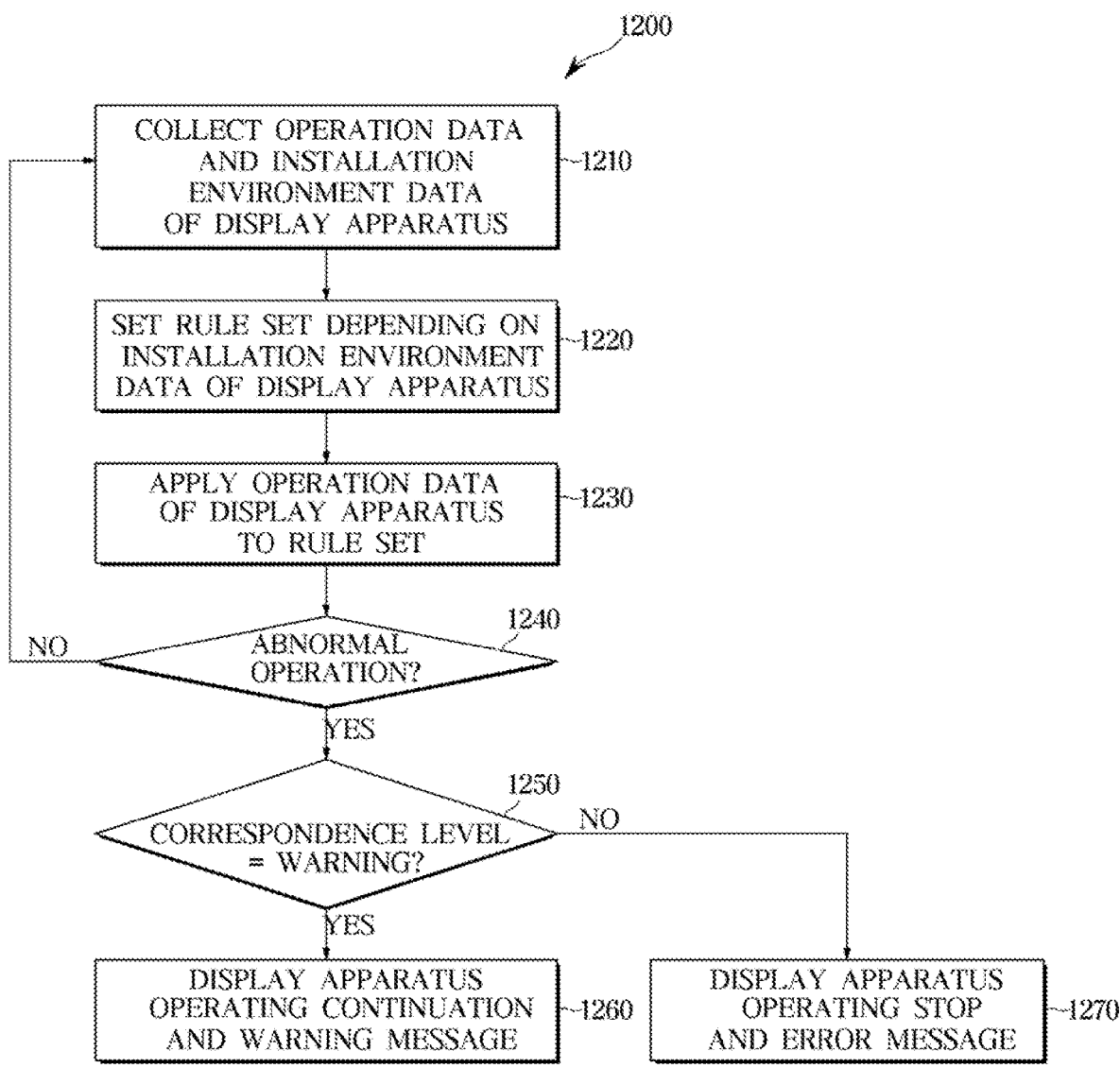

FIG. 9

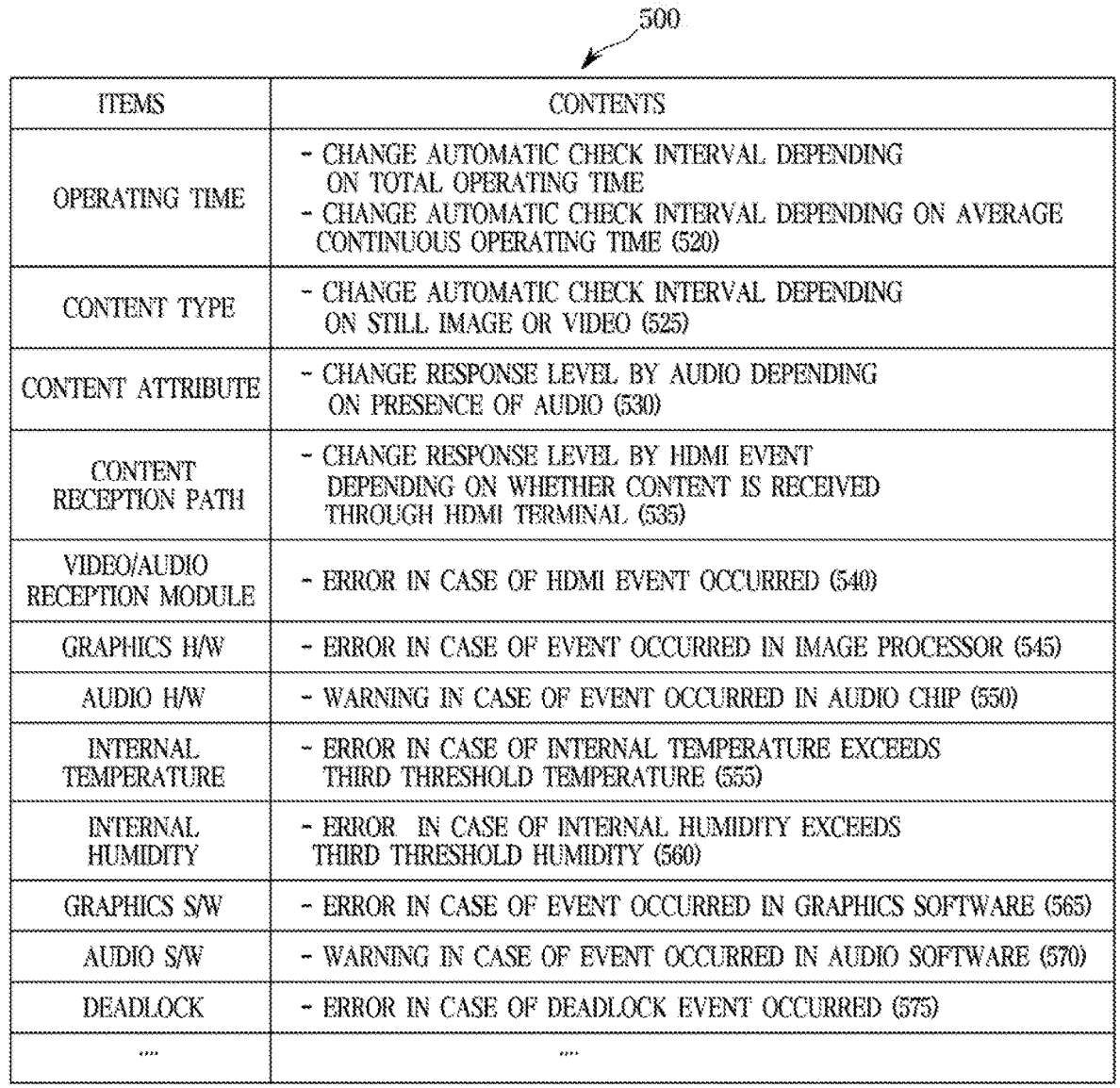

| ITEMS | CONTENTS |
|---|---|
| OPERATING TIME | - CHANGE AUTOMATIC CHECK INTERVAL DEPENDING ON TOTAL OPERATING TIME<br>- CHANGE AUTOMATIC CHECK INTERVAL DEPENDING ON AVERAGE CONTINUOUS OPERATING TIME (520) |
| CONTENT TYPE | - CHANGE AUTOMATIC CHECK INTERVAL DEPENDING ON STILL IMAGE OR VIDEO (525) |
| CONTENT ATTRIBUTE | - CHANGE RESPONSE LEVEL BY AUDIO DEPENDING ON PRESENCE OF AUDIO (530) |
| CONTENT RECEPTION PATH | - CHANGE RESPONSE LEVEL BY HDMI EVENT DEPENDING ON WHETHER CONTENT IS RECEIVED THROUGH HDMI TERMINAL (535) |
| VIDEO/AUDIO RECEPTION MODULE | - ERROR IN CASE OF HDMI EVENT OCCURRED (540) |
| GRAPHICS H/W | - ERROR IN CASE OF EVENT OCCURRED IN IMAGE PROCESSOR (545) |
| AUDIO H/W | - WARNING IN CASE OF EVENT OCCURRED IN AUDIO CHIP (550) |
| INTERNAL TEMPERATURE | - ERROR IN CASE OF INTERNAL TEMPERATURE EXCEEDS THIRD THRESHOLD TEMPERATURE (555) |
| INTERNAL HUMIDITY | - ERROR IN CASE OF INTERNAL HUMIDITY EXCEEDS THIRD THRESHOLD HUMIDITY (560) |
| GRAPHICS S/W | - ERROR IN CASE OF EVENT OCCURRED IN GRAPHICS SOFTWARE (565) |
| AUDIO S/W | - WARNING IN CASE OF EVENT OCCURRED IN AUDIO SOFTWARE (570) |
| DEADLOCK | - ERROR IN CASE OF DEADLOCK EVENT OCCURRED (575) |
| .... | .... |

DISPLAY APPARATUS AND CONTROLLING METHOD THEREOF

CROSS-REFERENCE TO RELATED APPLICATION(S)

This application is based on and claims priority under 35 U.S.C. § 119 to Korean Patent Application No. 10-2019-0112127, filed on Sep. 10, 2019 in the Korean Intellectual Property Office, the disclosure of which is incorporated by reference in its entirety.

BACKGROUND

1. Field

The disclosure relates to a display apparatus and a controlling method thereof, and more specifically to a display apparatus for monitoring and/or managing an abnormal operation of the display apparatus.

2. Description of Related Art

In general, a display apparatus is an output device that visually displays received or stored image information to a user, and is used in various home-based or business fields.

After the display apparatus is delivered to the user, a manufacturer of the display apparatus can monitor and manage the status of the display apparatus.

In the related art, manufacturers have focused on only the display apparatus itself to monitor/manage the operation of the display apparatus. For example, in order to determine the state of the display apparatus or an abnormal operation of the display apparatus, only the operation information of the display apparatus is considered. In other words, the manufacturer determines whether or not the display apparatus is abnormally operated and the level of the abnormal operation (for example, an operation error or an operation warning) based solely on the operation information of the current display apparatus.

As a result, under various installation environments and operating environments in which the display apparatus is installed, it is difficult for the manufacturer to accurately determine whether the display apparatus is abnormally operated.

SUMMARY

Provided are a display apparatus and a controlling method thereof for determining whether the display apparatus is abnormally operated, considering an installation environment in which the display apparatus is installed and an operating environment in which the display apparatus is operated.

Additional aspects will be set forth in part in the description which follows and, in part, will be apparent from the description, or may be learned by practice of the presented embodiments.

According to an aspect of the disclosure, there is provided a display apparatus including: at least one component; a storage configured to store at least one rule to diagnose the at least one component; and a controller configured to: acquire operation data of the at least one component, output at least one of a warning related to the at least one component or an error related to the at least one component, based on a result of applying the operation data to the at least one rule, acquire at least one of installation environment data of the display apparatus or operating environment data of the display apparatus, and update the at least one rule based on the at least one of the installation environment data or the operating environment data.

The installation environment data may include at least one of information on an installation country of the display apparatus, information on an indoor or outdoor installation of the display apparatus, information on an external temperature at the display apparatus, or information on an external humidity at the display apparatus.

The installation environment data may include at least one of a total operating time of the display apparatus, an average continuous operating time of the display apparatus, a type of output content, an attribute of output content, or a reception path of output content.

The at least one rule may include rules for errors in content reception of the display apparatus, rules for an internal temperature of the display apparatus, rules for an internal humidity of the display apparatus, rules for video display errors, and rules for sound output errors.

The display apparatus may further include: a content receiver; and a display panel configured to display content received by the content receiver, wherein the controller may be further configured to: display a warning message on the display panel while continuing to display the content, based on the warning related to the at least one component being output, and stop the display of the content and display an error message on the display panel, based on the error related to the at least one component being output, wherein the at least one component is included in the content receiver or is a different component of the display apparatus.

The controller may be further configured to: output a warning for the display apparatus based on an internal temperature of the display apparatus exceeding a first threshold temperature, and output an error of the display apparatus based on the internal temperature of the display apparatus exceeding a second threshold temperature and an external temperature of the display apparatus exceeding a reference temperature.

The controller may be further configured to: output a warning for the display apparatus based on an internal humidity of the display apparatus exceeding a first threshold humidity, and output an error of the display apparatus based on the internal humidity of the display apparatus exceeding a second threshold humidity and an external humidity of the display apparatus exceeding a reference humidity.

The controller may be further configured to: output an error of the display apparatus based on an error of an audio receiving device which may include the at least one component, and output a warning for the display apparatus based on the error of the audio receiving device when content output by the display apparatus may include no audio signal.

The controller may be further configured to: output an error of the display apparatus based on an error of content reception by a content reception terminal which may include the at least one component, and output a warning for the display apparatus based on the error of content reception by the content reception terminal when content is received through a communicator.

The controller may be further configured to change a diagnostic cycle of the display apparatus depending on an operating time of the display apparatus.

According to an aspect of the disclosure, there is provided a method of controlling a display apparatus, the method including: storing at least one rule to diagnose at least one component included in the display apparatus; acquiring operation data of the at least one component; outputting at least one of a warning for the at least one component or an error of the at least one component, based on a result of applying the operation data to the at least one rule; acquiring at least one of installation environment data of the display apparatus or operating environment data of the display apparatus; and updating the at least one rule based on the at least one of the installation environment data or the operating environment data.

The installation environment data may include at least one of information on an installation country of the display apparatus, information on an indoor or outdoor installation of the display apparatus, information on an external temperature at the display apparatus, or information on an external humidity at the display apparatus.

The installation environment data may include at least one of a total operating time of the display apparatus, an average continuous operating time of the display apparatus, a type of output content, an attribute of output content, or a reception path of output content.

The at least one rule may include rules for errors in content reception of the display apparatus, rules for an internal temperature of the display apparatus, rules for an internal humidity of the display apparatus, rules for video display errors, and rules for sound output errors.

The method may further include: displaying content on a display panel of the display apparatus; displaying a warning message while continuing to display the content based on the warning for the at least one component being output; and stopping the display of the content and displaying an error message on the display panel based on the error of the at least one component being output.

According to an aspect of the disclosure, there is provided a display system including: a server apparatus configured to store at least one rule; and a display apparatus configured to: receive the at least one rule from the server apparatus, and output at least one of a warning for at least one component of the display apparatus or an error in the at least one component, based on a result of applying operation data to the at least one rule, wherein the at least one rule is updated based on at least one of installation environment data of the display apparatus or operating environment data of the display apparatus.

The display apparatus may be further configured to transmit at least one of the warning for the at least one component or the error in the at least one component to the server apparatus.

The display apparatus may be further configured to update the at least one rule based on the at least one of the installation environment data or the operating environment data.

The display apparatus may be further configured to transmit the installation environment data and the operating environment data to the server apparatus, and the server apparatus may be further configured to update the at least one rule based on the at least one of the installation environment data or the operating environment data.

The display apparatus may be further configured to: display content on a display panel, display a warning message on the display panel while continuing to display the content based on the warning for the at least one component being output, and stop the display of the content and display an error message on the display panel based on the error of the at least one component being output.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 illustrates items for monitoring/managing a display apparatus according to an embodiment;

FIG. 4 illustrates a rule set for diagnosing a display apparatus according to an embodiment;

FIG. 5 illustrates an example of a diagnostic operation of a display apparatus according to an embodiment;

FIG. 6 illustrates an example of a diagnostic operation of a display apparatus according to an embodiment;

FIG. 7 illustrates updating a rule set by the diagnostic operation illustrated in FIG. 6;

FIG. 8 illustrates an example of a diagnostic operation of a display apparatus according to an embodiment;

FIG. 9 illustrates updating a rule set by the diagnostic operation illustrated in FIG. 8;

DETAILED DESCRIPTION

Figure 1:
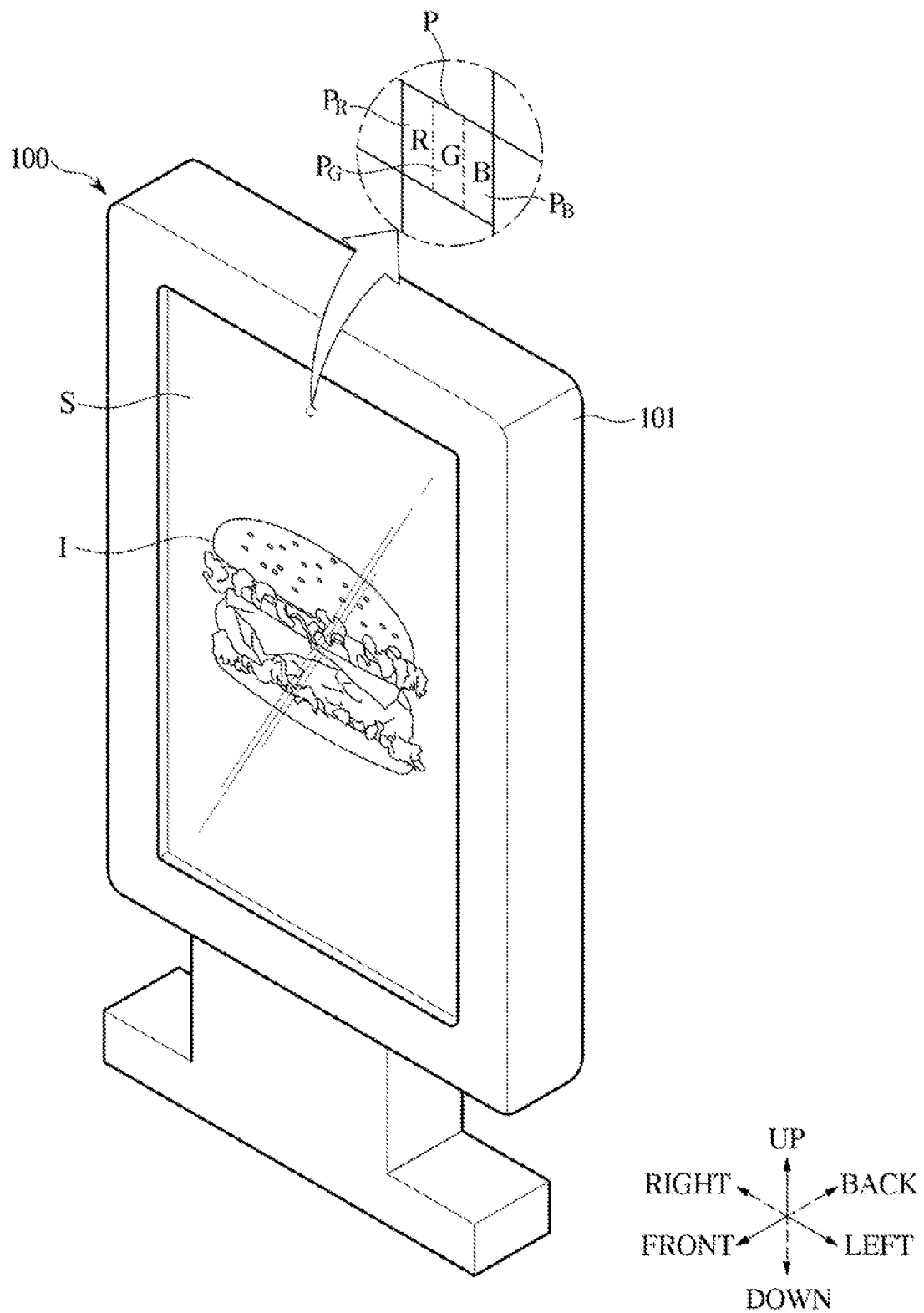
FIG. 1 is a view illustrating a display apparatus according to an embodiment.

In the following description, like reference numerals refer to like elements throughout the specification. This specification does not describe all elements of the embodiments, and in the technical field to which the present invention pertains, there is no overlap between the general contents or the embodiments. Terms such as "unit," "module," "member," and "block" may be embodied as hardware or software. According to embodiments, a plurality of "units," "modules," "members," or "blocks" may be implemented as a single component or a single "unit," "module," "member," or "block" may include a plurality of components.

In all specifications, it will be understood that when an element is referred to as being "connected" to another element, it can be directly or indirectly connected to the other element, wherein the indirect connection includes "connection via a wireless communication network."

Also, when a part "includes" or "comprises" an element, unless there is a particular description contrary thereto, the part may further include other elements, not excluding the other elements.

Throughout the specification, when one member is positioned "on" another member, this includes not only the case where one member abuts another member, but also the case where another member exists between the two members.

As used herein, the terms such as "1st" or "first," "2nd" or "second," etc., may modify corresponding components regardless of importance or order and are used to distinguish one component from another without limiting the components.

An expression used in the singular form encompasses the expression of the plural form, unless it has a clearly different meaning in the context.

The reference numerals used in operations are used for descriptive convenience and are not intended to describe the order of operations and the operations may be performed in an order different unless otherwise stated.

Hereinafter, certain embodiments will be described with reference to the accompanying drawings.

FIG. 1 is a view illustrating a display apparatus according to an embodiment.

A display apparatus 100 is a device capable of processing an image signal received from the outside and visually displaying the processed image. The display apparatus 100 is not limited by use, type, shape, and the like. For example, the display apparatus 100 may be implemented in various forms such as a television (TV), a monitor, a kiosk, a portable multimedia device, a portable communication device, and a portable computing device. If the display apparatus 100 is a device that visually displays an image, its form is not limited.

In addition, the display apparatus 100 may be a large format display (LFD) apparatus installed outdoors, such as on a roof of a building or at a bus stop.

Here, the outdoors is not necessarily limited to the outdoors, and the display apparatus 100 according to an embodiment may be installed in a subway station, a shopping mall, a movie theater, a company, a shop, etc., wherever a large number of people can enter or exit.

The display apparatus 100 may receive a video signal and an audio signal from various content sources, and output video and audio corresponding to the video signal and the audio signal. For example, the display apparatus 100 may receive television broadcast content through a broadcast reception antenna or a wired cable, receive content from a content playback device, or receive content from a content providing server on a network.

As shown in FIG. 1, the display apparatus 100 includes a main body 101 accommodating a plurality of parts for displaying an image I, and a screen S provided on one side of the main body 101 to display the image I.

The main body 101 forms an external shape of the display apparatus 100, and a component for the display apparatus 100 to display the image I may be provided inside the main body 101. The main body 101 shown in FIG. 1 is a flat plate shape, but the shape of the main body 101 is not limited to that shown in FIG. 1. For example, the main body 101 may have a shape in which both right and left ends protrude forward and a center portion is concave.

The screen S is formed on the front surface of the main body 101, and the image I, which is visual information, may be displayed on the screen S. For example, a still image or a video may be displayed on the screen S, and a two-dimensional (2D) flat image or a three-dimensional (3D) stereoscopic image may be displayed.

A plurality of pixels P are formed on the screen S, and the image I displayed on the screen S may be formed by a combination of light emitted from the plurality of pixels P. For example, one of the images I may be formed on the screen S by combining light emitted from the plurality of pixels P as a mosaic.

Each of the pixels P may emit light having different brightness and/or different colors.

Each of the plurality of pixels P includes a plurality of point light sources (e.g., organic light emitting diodes) capable of directly emitting light, or alternatively, includes a plurality of shutters (for example, a liquid crystal panel) capable of passing or blocking light emitted by a surface light source such as a backlight unit.

Each of the plurality of pixels P may include sub-pixels Pr, Pg, and Pb. The sub-pixels Pr, Pg, and Pb include the red sub-pixel Pr capable of emitting red light, the green sub-pixel Pg capable of emitting green light, and the blue sub-pixel Pb capable of emitting blue light. For example, red light may exhibit light from a wavelength of approximately 620 nm (nanometer, 1 billionth of a meter) to 750 nm, green light may represent light with a wavelength of approximately 495 nm to 570 nm, and blue light may represent light having a wavelength of approximately 450 nm to 495 nm.

A touch sensor capable of sensing a user's touch may be provided on the screen S or at an edge portion of the screen S.

The touch sensor may include, for example, an infrared touch frame or a capacitive touch panel or a resistive touch panel. The infrared touch frame may be provided at the edge portion of the screen S, and the user's touch may be sensed by detecting light blocked the user's body part. The capacitive touch panel may be provided on the screen S, and the user's touch may be sensed by detecting a change in the capacitance due to the user's contact or power level. The resistive touch panel may also be provided on the screen S, and the user's touch may be sensed by sensing pressure caused by the user's contact.

Figure 2:
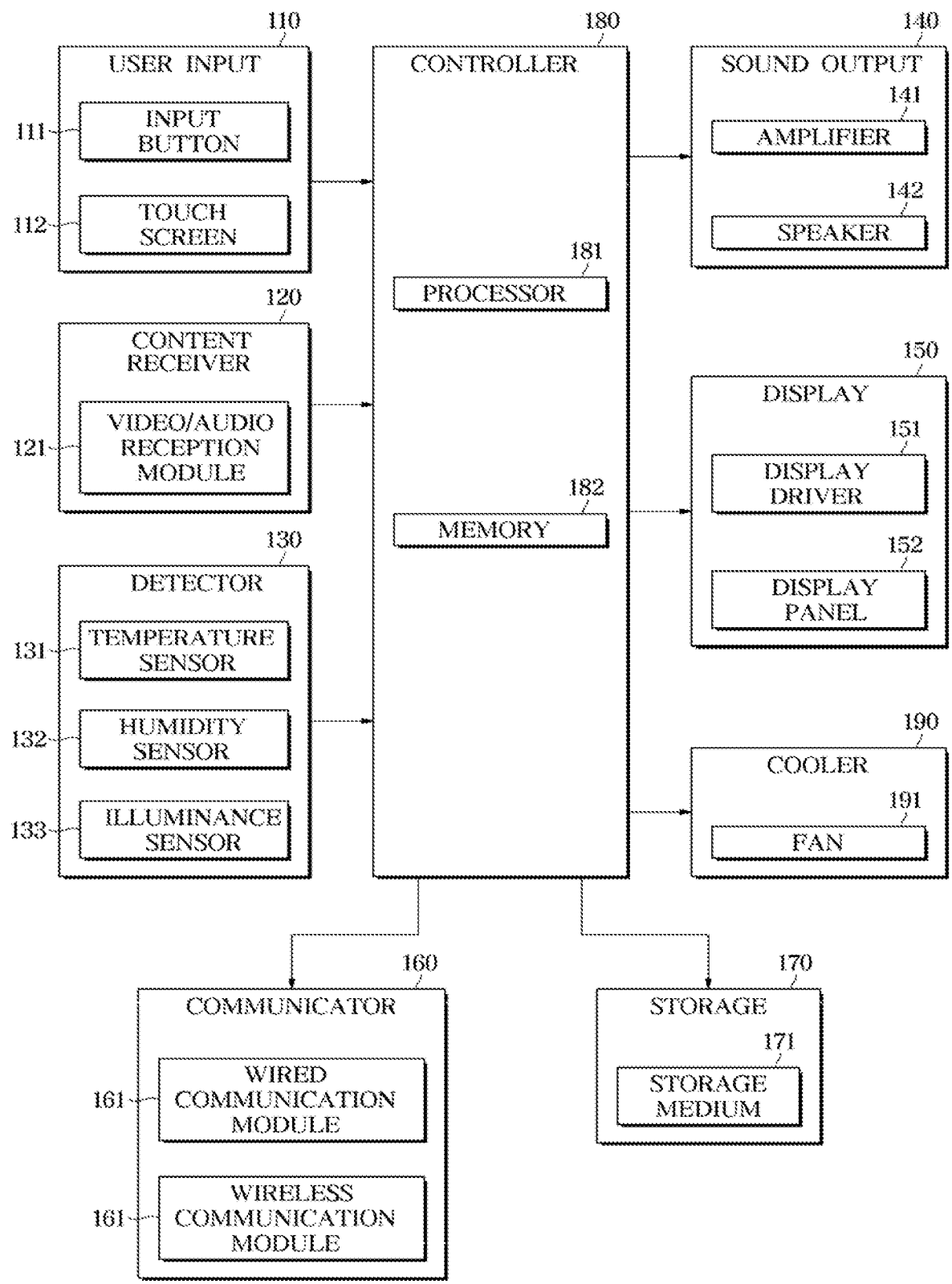
FIG. 2 is a view illustrating a control configuration of a display apparatus according to an embodiment.

FIG. 2 is a view illustrating a control configuration of a display apparatus according to an embodiment. FIG. 3 illustrates items for monitoring/managing a display apparatus according to an embodiment. FIG. 4 illustrates a rule set for diagnosing a display apparatus according to an embodiment.

Various components for displaying the image I on the screen S and detecting the user's touch may be provided inside the main body 101.

Referring to FIGS. 2, 3, and 4, the display apparatus 100 includes a user input 110 for receiving a user input from the user, a content receiver 120 for receiving video and/or audio signals from content sources; a detector 130 for collecting various operation information of the display apparatus 100, a sound output 140 for outputting sound, a display 150 for displaying images, a communicator 160 to communicate with external devices, a storage 170 for storing programs and data for controlling an operation of the display apparatus 100, a cooler 190 for cooling the interior of the display apparatus 100, and a controller 180 that processes the video signals and/or the audio signals received by the content receiver 120 and controls the operation of the display apparatus 100.

The user input 110 may include one or more input buttons 111 for receiving the user input. For example, the user input 110 may include a power button for turning on or off the display apparatus 100, a sound control button for adjusting the volume of the sound output from the display apparatus 100, and a source selection button for selecting a content source.

Each of the input buttons 111 may receive the user input and output an electrical signal corresponding to the user input to the controller 180, and may be implemented by various input means such as a push switch, a touch switch, a dial, a slide switch, and a toggle switch.

The user input 110 may include a touch screen 112 that can detect the user's access or contact to the screen S. The touch screen 112 may include, for example, an infrared touch frame, a capacitive touch panel or a resistive touch panel. The infrared touch frame may be provided at an edge portion of the screen S, and may detect the user's touch by acquiring light blocked by the user's body part, and acquire a touch location. The capacitive touch panel may be provided on the screen S, and the user's touch may be sensed and a touch position may be obtained by detecting a change in capacitance due to the user's contact or access. The resistive touch panel may also be provided on the screen S, and the user's touch may be sensed and a touch position may be obtained by sensing pressure caused by the user's contact.

The user's touch input may be determined based on an image displayed on the screen S and a touch position detected by the touch screen 112. For example, an image inducing the user's command or the user's selection is displayed on the screen S, and the touch location of the user may be obtained by the touch screen 112. Based on the comparison between the image displayed on the screen S and the touch position obtained by the touch screen 112, the user's command, that is, the user's touch input may be determined.

The content receiver 120 may include a video/audio reception module 121 that receives content including video signals and/or audio signals from content sources. For example, a video/audio reception module 121 may include a video receiving device coupled to a graphics processor, an image processor, etc., and an audio receiving device coupled to an audio processor, etc.

The video/audio reception module 121 may receive a video signal and an audio signal from content sources through a cable. For example, the video/audio reception module 121 includes a content reception terminal such as a component (YPbPr/RGB) terminal, a composite video blanking and sync (CVBS) terminal, an audio terminal, a High Definition Multimedia Interface (HDMI) terminal, a Universal Serial Bus (USB) terminal, and the like.

Optionally, the content receiver 120 may further include a tuner. The tuner may receive a broadcast signal from a broadcast reception antenna or a wired cable, and extract a broadcast signal of a channel selected by the user from among the broadcast signals. For example, the tuner may pass a broadcast signal having a frequency corresponding to a channel selected by the user among a plurality of broadcast signals received through the broadcast reception antenna or the wired cable, and block a broadcast signal having a different frequency.

As such, the content receiver 120 can receive video signals and audio signals from content sources through the video/audio reception module 121, and the video signal and/or the audio signal received through the video/audio reception module 121 may be output to the controller 180.

The detector 130 includes a temperature sensor 131 for sensing a temperature inside the display apparatus 100, a humidity sensor 132 for detecting humidity inside the display apparatus 100, and an illuminance sensor 133 that detects an illuminance outside.

The temperature sensor 131 may be installed inside the main body 101. For example, the temperature sensor 131 may be installed on a display panel 152 of the display 150, or may be installed on a printed circuit board on which various electric components are mounted.

The temperature sensor 131 measures the temperature inside the display apparatus 100 and outputs an electrical signal corresponding to the measured temperature to the controller 180. The temperature sensor 131 may include, for example, a thermistor whose electrical resistance value changes depending on the temperature.

The humidity sensor 132 may be provided inside the main body 101. For example, the humidity sensor 132 may be installed on the display panel 152 of the display 150, or may be installed on the printed circuit board on which the various electric components are mounted.

The humidity sensor 132 may measure the humidity inside the display apparatus 100 and output an electrical signal corresponding to the measured humidity to the controller 180. The humidity sensor 132 may include, for example, a polymer material whose electrical resistance value changes depending on ambient humidity, or a polymer material whose electrostatic capacity changes depending on the ambient humidity.

The illuminance sensor 133 may be exposed outside the display apparatus 100. For example, the illuminance sensor 133 may be exposed outside the display apparatus 100 through a hole formed at one side of a bezel of the main body 101.

The illuminance sensor 133 measures the illuminance outside the display apparatus 100 and outputs an electrical signal corresponding to the measured illuminance to the controller 180. The illuminance sensor 133 may include, for example, a cadmium sulfide (CdS) sensor in which an electrical resistance value changes according to ambient brightness, or a photodiode device that outputs different voltages according to the ambient brightness.

The sound output 140 includes an amplifier 141 for amplifying sound, and a speaker 142 for acoustically outputting the amplified sound.

The speaker 142 may convert an analog sound signal amplified by the amplifier 141 into sound (sound wave). For example, the speaker 142 may include a thin film that vibrates according to an electrical acoustic signal, and sound waves may be generated by vibration of the thin film.

The display 150 includes the display panel 152 for visually displaying an image and a display driver 151 for driving the display panel 152.

The display panel 152 may generate an image according to image data received from the display driver 151 and display the image.

The display panel 152 may include pixels as a unit for displaying an image. Each pixel may receive an electrical signal representing an image from the display driver 151 and output an optical signal corresponding to the received electrical signal. As such, one image may be displayed on the display panel 152 by combining the optical signals output from the plurality of pixels P.

The display apparatus 100 may include various types of the display panel 152 for displaying images. For example, the display apparatus 100 may include a self-luminous display panel that displays an image using a device that emits light by itself. Light emitting diode (LED) panels or organic LED (OLED) panels are representative self-luminous display panels. As an example, the display apparatus 100 may include a non-luminous display panel that displays an image by passing or blocking light emitted from a light source (backlight unit). A liquid crystal display (LCD) panel is a typical non-luminous display panel.

The display driver 151 may receive the image data from the controller 180 and drive the display panel 152 to display an image corresponding to the received image data.

The display driver 151 may transmit image data to each of a plurality of pixels included in the display panel 152. Each of the plurality of pixels may emit light depending on the received image data, and the emitted light may be combined to form one image.

The communicator 160 may include a wired communication module 161 for receiving content data from a content source by wire and a wireless communication module 162 for wirelessly receiving content data from a content source.

The wired communication module 161 may receive content data from a content source using various communication standards. For example, the wired communication module 161 may receive content data from a content source using Ethernet (Ethernet, IEEE 802.3 technology standard).

The wired communication module 161 may include a communication circuit including a processor and/or memory for decoding/encoding data for wired communication.

The wireless communication module 162 may connect to an access point (AP) or a communication base station (BS) using various wireless communication standards. Also, the wireless communication module 162 may receive content data from a content source through a connection relay or a communication base station.

For example, the wireless communication module 162, using a wireless communication standard such as Wi-Fi (WiFi™, IEEE 802.11 technology standard) or Bluetooth (Bluetooth™, IEEE 802.15.1 technology standard) or Zig-Bee™ (IEEE 802.15.4 technology standard), can connect to an access repeater and receive content data received from a content source through the connection relay. In addition, the wireless communication module 162 may access the communication base station using wireless communication standards such as CDMA, WCDMA, GSM, LTE, and WiBro, and receive content data from a content source through the communication base station.

The wireless communication module 162 may include an antenna for transmitting and receiving a wireless signal and a communication circuit including a processor and/or memory for decoding/encoding data for wireless communication.

The storage 170 includes a storage medium 171 for storing programs and data for controlling the operation of the display apparatus 100. In addition, the storage 170 may include a management circuit including a processor and/or memory for managing data stored in the storage medium 171.

For example, the storage medium 171 may store an operating system (OS) that manages resources (e.g., software and/or hardware of the display apparatus) included in the display apparatus 100, a video player that decodes content data and restores video, a management application, etc. for managing the display apparatus 100.

The storage medium 171 may store content data displayed by the display apparatus 100. For example, the storage medium 171 may store an image file in which content data is compressed/encoded.

The storage medium 171 may include anon-volatile memory to preserve stored programs and data even when the power is cut off. For example, the storage medium 171 may include flash memory, a solid state drive (SSD), a hard disc drive, or an optical disc drive.

The cooler 190 may include a fan 191 cooling the inside of the main body 101 of the display apparatus 100 in response to a control signal from the controller 180. The fan 191 may discharge air inside the main body 101 to the outside of the main body 101 or suck air outside the main body 101 into the main body 101.

Electrical components included in the display apparatus 100 may be heated by an electric current. For example, the light sources included in the display panel 152 may not only emit light but also emit heat. The air inside the main body 101 is heated due to the heated display panel 152, and the internal temperature of the main body 101 may rise.

The fan 191 may lower the internal temperature of the main body 101 by discharging the heated air inside the main body 101 or lower the internal temperature of the main body 101 by sucking air outside the main body 101. In addition, the fan 191 may lower the humidity inside the main body 101 by discharging the heated air inside the main body 101 or sucking air outside the main body 101.

The controller 180 may include a processor 181 for processing content data and the user's touch input, and a memory 182 for storing content data and processing data such as the user's touch input.

The memory 182 may store programs and data for processing content data, and temporarily store the content data while processing the content data.

The memory 182 includes a non-volatile memory such as read only memory (ROM) and flash memory for storing data for a long period of time, and a volatile memory such as static random access memory (S-RAM) and dynamic random access memory (D-RAM) for temporarily storing data.

The memory 182 may include one memory chip including a plurality of memory cores, or may include a plurality of memory chips.

The processor 181 may decode the content data received through the communicator 160 and/or the content data stored in the storage 170, and output decoded image data and sound data from the content data. The image data may be displayed as an image through the display panel 152. The sound data may be output as sound through the speaker 142.

The processor 181 may output the image data of the image inducing the user's command or the user's selection to the display 150 and receive touch data indicating the user's touch location from the user input 110. The processor 181 may determine the user's command, that is, the user's touch input, based on the image data and the touch data. The processor 181 may output the image data for displaying the image in response to the user's touch input to the display 150.

The processor 181 may include one processor chip including a plurality of cores, or may include a plurality of processor chips. For example, the processor 181 may include an image processor for processing an image, a micro controller for processing the user's touch input, and controlling the operation of the display apparatus 100.

In addition, the processor 181 may be provided separately from the memory 182 or may be provided integrally with the memory 182.

As such, the controller 180 including the processor 181 and the memory 182 processes content data and/or the user's touch input, and displays an image corresponding to content data and/or an image responsive to the user's touch input on the display panel 152 of the display 150.

The controller 180 can perform self-diagnosis and monitor/manage an operation of each of the components included in the display apparatus 100. For example, the controller 180 collects environmental data around the display apparatus 100 and/or operation data of the components included in the display apparatus 100, and manage/monitor the operation of each of the components included in the display apparatus 100 based on the collected environmental data and/or the operation data.

The controller 180 may collect data 200 of items as illustrated in FIG. 3 to perform self-diagnosis.

The controller 180 may collect motion data, e.g., operation data 205 of the video/audio reception module 121. The controller 180 may monitor a connection state of a high-definition multimedia interface terminal, for example, based on a signal of a specific pin included in the high-definition multimedia interface terminal. When a connection error of the high-definition multimedia interface terminal is detected, the controller 180 can generate an event for checking an operation error of the display apparatus 100 independently of the main operation (for example, an operation of decoding content data and displaying an image).

The controller 180 may collect operation data 210 of graphics hardware (H/W). For example, the controller 180 may detect an operation error of the image processor based on a signal of a specific pin included in the image processor. The controller 180 may generate an event independently of the main operation when an operation error of the image processor is detected.

The controller 180 may collect operation data 215 of audio hardware (H/W), e.g., the audio receiver. For example, the controller 180 may detect an operation error of an audio processor based on a signal of a specific pin included in the audio processor, and generate an event independent of the main operation in response to an operation error of the audio processor.

The controller 180 can periodically detect an internal temperature 220 and an internal humidity 225 of the display apparatus 100. For example, the controller 180 may acquire the temperature measured by the temperature sensor 131 and the humidity measured by the humidity sensor 132 in response to a periodic event signal.

The controller 180 may collect operation data 230 of graphics software (S/W) and motion data, e.g., operation data 235 of audio software (S/W). For example, the controller 180 may detect an operation error of the graphics software and/or audio software based on the output of a specific function or specific flag included in the graphics software and audio software. The controller 180 may generate an event in response to an operation error of the graphics software and/or audio software.

The controller 180 may collect operation data 240 regarding an infinite loop (Deadlock) of software. For example, the controller 180 may include monitoring software for monitoring an infinite loop of software, and may detect an infinite loop of software based on the output of the monitoring software. The controller 180 can generate an event in response to an infinite loop of software.

The controller 180 may monitor not only the operation data of the display apparatus 100 itself described above, but also the installation environment data indicating the installation environment in which the display apparatus 100 is installed and/or the operating environment data indicating the environment in which the display apparatus 100 is operated.

The controller 180 can obtain information 245 about a country where the display apparatus 100 is installed. For example, when installing the display apparatus 100, the user may select an installation country or the controller of the display apparatus 100 may input an installation code of the installation country. The controller 180 can check the installation country based on the user input or seller input. In addition, when the display apparatus 100 is connected to a network (e.g., the Internet), the controller 180 can check the installation country based on identification information (e.g., IP address) of the display apparatus 100 on the network.

The controller 180 may obtain information 250 regarding an installation location where the display apparatus 100 is installed. For example, the controller 180 may obtain a more accurate installation location, such as a city in which the display apparatus 100 is installed, based on the user input or seller input. In addition, when the display apparatus 100 includes a GPS (Global Positioning System) receiver, the controller 180 can check the installation location of the display apparatus 100 based on the output of the GPS receiver.

The controller 180 may obtain information 255 regarding whether the display apparatus 100 is installed indoors or outdoors. For example, the controller 180 may obtain information regarding a location where the display apparatus 100 is installed based on the user input or seller input. In addition, the controller 180 may determine whether the display apparatus 100 is installed indoors or outdoors based on the output of the illuminance sensor 133.

The controller 180 may acquire an external temperature 260 and/or an external humidity 265 of the display apparatus 100. The controller 180 may sense the external temperature and/or external humidity of the display apparatus 100 based on, for example, the output of a temperature sensor and/or a humidity sensor installed outside the display apparatus 100. Also, the controller 180 may receive information regarding the external temperature and/or humidity through a network (e.g., the Internet).

The controller 180 can detect an external illuminance 270 of the display apparatus 100. For example, the controller 180 may acquire the illuminance sensed by the illuminance sensor 133 in response to a periodic event signal.

The controller 180 may obtain information 275 (e.g., type of installation location) about the location where the display apparatus 100 is installed. For example, the controller 180 may obtain information regarding whether the display apparatus 100 is installed in a retail store, an office, or a home, based on the user input or seller input.

The controller 180 may collect information 280 regarding an operating time of the display apparatus 100. For example, the controller 180 may count the operating time of the display apparatus 100 using a counter included in the controller 180 during the operation of the display apparatus 100. The controller 180 may obtain information related to the operating time of the display apparatus 100, such as the total operating time of the display apparatus 100, the average continuous operating time, and the maximum continuous operating time, based on the output of the counter.

The controller 180 can acquire a type 285 of content displayed/output on the display apparatus 100. For example, the controller 180 can monitor whether the content displayed on the display apparatus 100 is a still image or a video. In addition, it is possible to monitor whether the content displayed on the display apparatus 100 is a color image or a mono image. The controller 180 may determine the type of content based on a result of processing image data received through the content receiver 120 and/or the communicator 160.

The controller 180 can acquire an attribute 290 of the content displayed/output on the display apparatus 100. For example, the controller 180 may determine whether the content displayed on the display apparatus 100 includes audio or may determine the average brightness and/or average color of the content displayed on the display apparatus 100. The controller 180 may determine the attribute of the content based on the result of processing the image data.

The controller 180 may determine a reception path 295 of the content displayed/output on the display apparatus 100. For example, the controller 180 may monitor whether the content is received through the video/audio reception module 121, the wired communication module 161 or the wireless communication module 162.

As such, the controller 180 can collect the installation environment data and the operating environment data of the display apparatus 100 as well as the operation data of the display apparatus 100. The controller 180 can store the operation data, the installation environment data, and the operating environment data in the storage 170.

The controller 180 may diagnose the display apparatus 100 based on the operation data, the installation environment data, and the operating environment data of the display apparatus 100, and determine whether the display apparatus 100 is abnormally operated based on the diagnosis result. Also, the controller 180 may determine a level of a corresponding operation corresponding to an abnormal operation of the display apparatus 100.

The controller 180 may store a rule set for diagnosing the display apparatus 100 in the storage 170. For example, the rule set may include rules or criteria for determining whether the display apparatus 100 is abnormally operated based on the operation data, the installation environment data, and the operating environment data of the display apparatus 100. In addition, the rule set may include a response signal or a response action (response level) in response to the determination of the abnormal operation of the display apparatus 100.

For example, the controller 180 may determine a warning or error in response to a diagnosis result using the rule set. In response to the warning determination, the controller 180 continues to display the image based on the content data, but may display a message indicating abnormal operation of the display apparatus 100 on one side of the display panel 152. For example, the controller 180 may display a warning message indicating that the display apparatus 100 needs to be checked on one side of the screen S.

Further, in response to the error determination, the controller 180 stops displaying the image based on the content data, and sends a message indicating an abnormal operation of the display apparatus 100 through the display panel 152 to the entire display panel 152. For example, the controller 180 may display an error message indicating that repair of the display apparatus 100 is required on the entire screen S. In addition, the controller 180 may transmit a message requesting customer service to a manufacturer of the display apparatus 100 through the communicator 160.

As shown in FIG. 4, a rule set 300 may include a rule 305 for determining an error of the display apparatus 100 in response to a connection error event of the high-definition multimedia interface terminal. For example, the controller 180 may determine an error of the display apparatus 100 in response to an event indicating a connection error of the high-definition multimedia interface terminal. The controller 180 may stop outputting an image based on content data and display a message indicating an abnormal operation of the display apparatus 100 in response to an error determination due to a connection error of the high-definition multimedia interface terminal.

The rule set 300 may include rules 310 and 315 for determining an error of the display apparatus 100 in response to an operation error event of the graphics hardware or an operation error event of the audio hardware. For example, the controller 180 may stop outputting an image based on content data in response to an error determination due to an operation error of the graphics hardware or an operation error of the audio hardware.

The rule set 300 may include rules 320 and 325 for determining a warning for the display apparatus 100 in response to the internal temperature of the display apparatus 100 exceeding a first threshold temperature or the internal humidity exceeding a first threshold humidity. The controller 180 continues to output the image based on the content data, but may display a message indicating an abnormal operation of the display apparatus 100 on one side of the screen S in response to a warning judgment by the internal temperature or the internal humidity of the display apparatus 100.

The controller 180 can operate the fan 191 of the cooler 190 or increase the rotation speed of the fan 191 to lower the internal temperature of the display apparatus 100 in response to the internal temperature of the display apparatus 100 exceeding the first threshold temperature. In addition, the controller 180 may operate the fan 191 of the cooler 190 or increase the rotational speed of the fan 191 to lower the internal temperature of the display apparatus 100 in response to the internal humidity of the display apparatus 100 exceeding the first threshold humidity.

The controller 180 may lower the amount of current supplied to the display panel 152 in order to lower the internal temperature of the display apparatus 100 in response to the internal temperature of the display apparatus 100 exceeding the first threshold temperature. In other words, the controller 180 may lower the brightness of the image displayed on the display panel 152 in order to lower the internal temperature of the display apparatus 100.

The controller 180 may also perform an operation to lower the internal temperature of the display apparatus 100 before determining the abnormal operation of the display apparatus 100. For example, if the internal temperature of the display apparatus 100 is higher than a threshold temperature lower than the first threshold temperature, the controller 180 may lower the internal temperature of the display apparatus 100 before determining the abnormal operation of the display apparatus 100 by operating the fan 191 or increasing the rotational speed of the fan 191. In addition, the controller 180 may lower the brightness of the image displayed on the display panel 152 before determining the abnormal operation of the display apparatus 100 when the internal temperature of the display apparatus 100 is higher than a threshold temperature lower than a first threshold temperature.

The rule set 300 may include rules 330 and 335 for determining an error of the display apparatus 100 in response to an operation error of the graphics software or an operation error of the audio software. For example, the controller 180 may stop outputting an image based on content data in response to an error determination due to an operation error of the graphics software or an operation error of the audio software.

The rule set 300 may include a rule 340 that determines an error of the display apparatus 100 in response to an infinite loop of software. For example, the controller 180 may stop outputting an image based on content data in response to an error determination caused by an infinite loop of software.

The rule set 300 may be changed depending on the installation environment data and/or the operating environment data of the display apparatus 100.

The criteria for determining the rule may be changed depending on the installation environment data and/or the operating environment data of the display apparatus 100. For example, rules regarding the internal temperature of the display apparatus 100 may be changed depending on the external temperature of the display apparatus 100. The first threshold temperature for determining whether to warn the display apparatus 100 may be changed to a second threshold temperature depending on an increase in the external temperature of the display apparatus 100.

Further, the corresponding level of the rule may be changed depending on the installation environment data and/or the operating environment data of the display apparatus 100. For example, the corresponding level related to the internal temperature of the display apparatus 100 may be changed from a warning to an error depending on an increase in the external temperature of the display apparatus 100.

Failure determination of the display apparatus 100 using the rule set and the change of the rule set are described in more detail below.

FIG. 5 illustrates an example of a diagnostic operation of a display apparatus according to an embodiment.

As shown in FIG. 5, diagnostic operation 1000 of the display apparatus 100 is described.

The display apparatus 100 collects the operation data (operation 1010).

The controller 180 may collect the operation data of the display apparatus 100 based on outputs of the user input 110, the content receiver 120, the detector 130, the sound output 140, the display 150, the communicator 160, and the storage 170.

For example, the controller 180 may collect the operation data of the high-definition multimedia interface by an output signal of the video/audio reception module 121. The controller 180 may collect the internal temperature and the internal humidity of the display apparatus 100 by the output signals of the temperature sensor 131 and the humidity sensor 132, respectively. The controller 180 may collect the operation data of graphics hardware/audio hardware/graphics software/audio software based on output signals of the processor 181 and/or the memory 182.

The display apparatus 100 applies the operation data to the rule set (operation 1020).

The controller 180 can apply the operation data of the display apparatus 100 to the rule set stored in the storage 170. In other words, the controller 180 can diagnose the display apparatus 100 using the rule set.

The rule set may include rules or criteria for determining whether the display apparatus 100 is abnormally operated based on the operation data of the display apparatus 100. Further, the rule set may include a response signal or a response action (response level) in response to the determination of the abnormal operation of the display apparatus 100.

The controller 180 may input the operation data into rules or judgment criteria included in the rule set, and obtain a determination result based on the rules or the judgment criteria.

The display apparatus 100 determines whether the operation is abnormal (operation 1030).

The controller 180 may apply the operation data to the rules or the judgment criteria included in the rule set, and determine whether the display apparatus 100 is abnormally operated based on the judgment result based on the rules or the judgment criteria.

For example, the controller 180 may determine the abnormal operation of the display apparatus 100 based on a connection error event of the high-definition multimedia interface terminal. The controller 180 may determine the abnormal operation of the display apparatus 100 based on an operation error event of the graphics/audio hardware/software. The controller 180 may determine the abnormal operation of the display apparatus 100 based on whether the internal temperature exceeds the first threshold temperature or the internal humidity exceeds the first threshold humidity.

If the abnormal operation of the display apparatus 100 is not determined (NO in 1030), the display apparatus 100 continues the operation and continues to collect the operation data. If the abnormal operation of the display apparatus 100 is determined (YES in 1030), the display apparatus 100 determines whether the response action (response level) in response to the abnormal operation is a warning (operation 1040).

The controller 180 may determine a response action corresponding to the abnormal operation of the display apparatus 100 based on a response action (response level) of the rule set.

For example, the controller 180 may determine an error of the display apparatus 100 in response to a connection error event of the high-definition multimedia interface terminal. The controller 180 may determine an error of the display apparatus 100 in response to an operation error event of graphics/audio hardware/software. The controller 180 may determine a warning for the display apparatus 100 in response to the internal temperature exceeding the first threshold temperature or the internal humidity exceeding a first threshold humidity.

If the response action (response level) in response to the abnormal operation is a warning (YES in 1040), the display apparatus 100 continues displaying the image and displays a warning message (operation 1050).

The controller 180 may continue displaying an image based on content data, for example, in response to the internal temperature exceeding the first threshold temperature or the internal humidity exceeding the first threshold humidity. The controller 180 may display a warning message indicating that the display apparatus 100 needs to be checked on one side of the display panel 152 while displaying an image based on content data.

The controller 180 may perform an operation corresponding to the abnormal operation while displaying an image based on content data. The controller 180 may start the fan 191 or increase the rotational speed of the fan 191 in response to, for example, the internal temperature exceeding the first threshold temperature or the internal humidity exceeding the first threshold humidity. In addition, the controller 180 may lower the brightness of the image displayed on the display panel 152 in response to the internal temperature exceeding the first threshold temperature or the internal humidity exceeding the first threshold humidity.

If the response action (response level) in response to the abnormal operation is not a warning (NO in 1040), the display apparatus 100 stops displaying the image and displays an error message (operation 1060).

The controller 180 may stop displaying an image based on content data, for example, in response to an operation error event of graphics/audio hardware/software. In addition, the controller 180 may display an error message indicating that repair of the display apparatus 100 is required to the entire display panel 152 while the image display by the content data is stopped.

As described above, the display apparatus 100 may perform self-diagnosis based on the rule set, and may continue or stop displaying the image according to the self-diagnosis result depending on the rule set. Thereby, without the user's separate action, the display apparatus 100 can detect an abnormal action by itself and suggest a measure for solving the abnormal action.

FIG. 6 illustrates an example of a diagnostic operation of a display apparatus according to an embodiment. FIG. 7 illustrates updating a rule set by the diagnostic operation illustrated in FIG. 6.

As shown in FIGS. 6 and 7, diagnostic operation 1100 of the display apparatus 100 is described.

The display apparatus 100 collects the operation data and the installation environment data (operation 1110).

The controller 180 may collect the operation data and the installation environment data of the display apparatus 100 based on the outputs of the user input 110, the content receiver 120, the detector 130, the sound output 140, the display 150, the communicator 160, and the storage 170.

The collection of the operation data may be the same as operation 1010 described with reference to FIG. 5. The controller 180 may collect the installation environment data depending on, for example, the user input through the user input 110.

For example, the controller 180 may obtain information about the installation country, information about the installation location, and information about an indoor or outdoor installation by the user input through the user input 110. In addition, the controller 180 can obtain information about the external temperature and external humidity from the detector 130 or from the communicator 160.

The display apparatus 100 resets the rule set based on the installation environment data (operation 1120).

The controller 180 may reset the rule set 400 as illustrated in FIG. 7 based on the collected installation environment data.

The controller 180 may reset the corresponding level of the abnormal operation due to the internal temperature/internal humidity based on the country of installation (405). For example, if the annual average temperature of the country of installation exceeds a reference temperature, the controller 180 may reset the rule's response to the internal temperature from "warning" to "error."

The controller 180 may reset the criterion for determining the abnormal operation due to the internal temperature/internal humidity based on the installation location (410). For example, if the average temperature of the installation location exceeds the reference temperature, the controller 180 sets the rule's criteria regarding the internal temperature from "When the internal temperature exceeds the first threshold temperature" to "When the internal temperature exceeds the second threshold temperature." The second threshold temperature may be lower than the first threshold temperature.

The controller 180 may reset the determination criterion for the abnormal operation due to the internal temperature/internal humidity based on the indoor or outdoor installation (415). For example, when the display apparatus 100 is installed outdoors, the controller 180 resets the criteria for determining the rule regarding the internal temperature from "When the internal temperature exceeds the first threshold temperature" to "When the internal temperature exceeds the second threshold temperature."

The controller 180 may reset the criteria for determining the abnormal operation due to the internal temperature/internal humidity based on the external temperature/external humidity of the display apparatus 100 (416, 417). For example, when the external temperature of the display apparatus 100 exceeds the reference temperature, the controller 180 resets the criteria for determining the rule regarding the internal temperature from "When the internal temperature exceeds the first threshold temperature" to "When the internal temperature is the second threshold temperature." The second threshold temperature may be higher than the first threshold temperature.

The controller 180 may reset the criterion for determining the abnormal operation due to the internal temperature/internal humidity based on the external illuminance of the display apparatus 100 (418). For example, if the average external illuminance of the display apparatus 100 exceeds a reference illuminance, the controller 180 sets the criteria for determining the rule for the internal temperature from "When the internal temperature exceeds the first threshold temperature" to "When the internal temperature exceeds second threshold temperature exceeded." The second threshold temperature may be higher than the first threshold temperature.

The controller 180 may reset an automatic inspection period and the corresponding level of the abnormal operation based on the type of the installation site (420). For example, when the display apparatus 100 is located at a commercial store, the controller 180 can be used by various people, thereby reducing a cycle of self-diagnosis of the display apparatus 100, and reset the response level of the abnormal operation from "warning" to "error" for the convenience of the user.

The display apparatus 100 applies the operation data to a reset rule set (operation 1130).

The controller 180 can apply the operation data of the display apparatus 100 to the rule set reset by the installation environment data. In other words, the controller 180 may diagnose the display apparatus 100 using the rule set reset by the installation environment data.

For example, the controller 180 may apply the operation data of the display apparatus 100 to rules 425, 430, 435, 440, 445, 450, 455, and 460 shown in FIG. 7. For example, the controller 180 may apply the internal temperature of the display apparatus 100 to the rule 440 reset by the installation country, the installation location, the indoor/outdoor installation or the external temperature. In addition, the controller 180 can apply the internal humidity of the display apparatus 100 to the reset rule 445.

The display apparatus 100 determines whether the operation is abnormal (operation 1140).

The controller 180 may apply the operation data to the reset rule, and determine whether the display apparatus 100 is abnormally operated based on the determination result by the rule. For example, the controller 180 may input the internal temperature of the display apparatus 100 in the reset rule 440 and determine whether the display apparatus 100 is abnormally operated. In addition, the controller 180 may input the internal humidity of the display apparatus 100 in the reset rule 445 and determine whether the display apparatus 100 is abnormal.

When the abnormal operation of the display apparatus 100 is not determined (NO in 1140), the display apparatus 100 continues the operation and continues to collect the operation data. When the abnormal operation of the display apparatus 100 is determined (YES in 1140), the display apparatus 100 determines whether the response action (response level) in response to the abnormal operation is a warning (operation 1150).

The controller 180 may determine a response action corresponding to the abnormal operation of the display apparatus 100 based on a response action (response level) of the rule set. For example, when the internal temperature of the display apparatus 100 exceeds the second threshold temperature, the controller 180 may determine an error of the display apparatus 100 by the reset rule 440. In addition, when the internal humidity of the display apparatus 100 exceeds the second threshold humidity, the controller 180 may determine an error of the display apparatus 100 by the reset rule 445.

When the response action (response level) in response to the abnormal operation is a warning (YES in 1150), the display apparatus 100 continues displaying the image and displays a warning message (operation 1160).

When the response action (response level) in response to the abnormal operation is not a warning (NO in 1150), the display apparatus 100 stops displaying the image and displays an error message (operation 1170).

Operation 1160 and operation 1170 may be the same as operation 1050 and operation 1060 illustrated in FIG. 5.

As described above, the display apparatus 100 may perform self-diagnosis based on the rule set. At this time, the rule set may be changed or reset according to the installation environment of the display apparatus 100. In other words, the self-diagnosis of the display apparatus 100 reflects the installation environment of the display apparatus 100. As described above, by reflecting the installation environment of the display apparatus 100 in the self-diagnosis of the display apparatus 100, an efficient and accurate self-diagnosis of the display apparatus 100 can be provided.

FIG. 8 illustrates an example of a diagnostic operation of a display apparatus according to an embodiment. FIG. 9 illustrates updating a rule set by the diagnostic operation illustrated in FIG. 8.

As shown in FIGS. 8 and 9, diagnostic operation 1200 of the display apparatus 100 is described.

The display apparatus 100 collects the operation data and the operating environment data (operation 1210).

The controller 180 may collect the operation data of the display apparatus 100 and obtain the operating environment data of the display apparatus 100 based on an operation record of the display apparatus 100 based on the output of the user input 110, the content receiver 120, the detector 130, the sound output 140, the display 150, the communicator 160 and the storage 170.

The collection of the operation data may be the same as operation 1010 described with reference to FIG. 5.

The controller 180 may obtain the operating environment data of the display apparatus 100 based on, for example, an operation log of the display apparatus 100 stored in the storage 170.

The controller 180 may store the operation data of the display apparatus 100 as an operation log in the storage 170 during the operation of the display apparatus 100. The controller 180 may obtain the operating environment data of the display apparatus 100 based on the operation log recorded during the operation of the display apparatus 100.

For example, the controller 180 may collect the operating time of the display apparatus 100 and the type, attribute, and reception path of content output by the display apparatus 100.

The display apparatus 100 resets the rule set based on the operating environment data (operation 1220).

The controller 180 may reset the rule set 500 as illustrated in FIG. 9 based on the collected installation environment data.

The controller 180 may reset the cycle of self-diagnosis according to the total operating time of the display apparatus 100 (520). For example, if the total operating time of the display apparatus 100 exceeds a first reference time, the controller 180 can reduce the period of self-diagnosis of the display apparatus 100. Since the lifetime of the organic light emitting diode is relatively short, in the case of the display apparatus 100 including the organic light emitting diode, it is preferable to reduce the cycle of self-diagnosis of the display apparatus 100 depending on the total operating time. In addition, the controller 180 may reset the cycle of self-diagnosis depending on the number of times the continuous operation time of the display apparatus 100 exceeds a second reference time.

The controller 180 may reset the cycle of self-diagnosis according to the type of content output by the display apparatus 100 (525). For example, the display apparatus 100 may reset the cycle of self-diagnosis depending on whether the image displayed on the display apparatus 100 is a still image or a video. The display apparatus 100 including an organic light emitting diode may generate an afterimage by displaying a still image for a long period of time (burn-in phenomenon). Therefore, when the display apparatus 100 including the organic light emitting diode displays a still image, it is preferable to reduce the cycle of self-diagnosis of the display apparatus 100.

The controller 180 may reset the corresponding level in response to an audio hardware error or an audio software error (530), depending on the attribute of the content output by the display apparatus 100. For example, if the content output by the display apparatus 100 does not include audio, even if there is an error in the audio hardware or audio software, a service that the display apparatus 100 intends to provide may be sufficiently provided to the user, and there is no discomfort to the user. Accordingly, the controller 180 can reset the response level in response to an audio hardware error or an audio software error from "error" to "warning."

The controller 180 may reset the corresponding level in response to the error of the video/audio reception module 121, depending on the reception path of the content data (535). For example, when the display apparatus 100 receives content data through the wired communication module 161 or the wireless communication module 162, even if there is an error in the video/audio reception module 121, the service intended to be provided by the display apparatus 100 can be sufficiently provided, and there is no discomfort to the user. Accordingly, the controller 180 may reset the corresponding level in response to the error of the video/audio reception module 121 from "error" to "warning."

The display apparatus 100 applies the operation data to the reset rule set (operation 1230).

The controller 180 may apply the operation data of the display apparatus 100 to the rule set reset by the operating environment data. In other words, the controller 180 can diagnose the display apparatus 100 using the rule set reset by the operating environment data.

For example, the controller 180 may apply the operation data of the display apparatus 100 to rules 540, 545, 550, 555, 560, 565, 570, and 575 shown in FIG. 9. For example, the controller 180 may apply an error of the audio of the display apparatus 100 to the rules 550 and 570 reset by the attribute of the content. In addition, the controller 180 may apply an error of the video/audio reception module 121 to the rule 545 reset by the reception path of the content.

The display apparatus 100 determines whether the operation is abnormal (operation 1240).

The controller 180 may apply the operation data to the reset rule, and determine whether the display apparatus 100 is abnormally operated based on the determination result by the rule. For example, the controller 180 may determine whether the display apparatus 100 is abnormally operated by the reset rules 550 and 570. Also, the controller 180 may determine whether the display apparatus 100 is abnormally operated by the reset rule 545.

When the abnormal operation of the display apparatus 100 is not determined (NO in 1240), the display apparatus 100 continues the operation and continues to collect the operation data.

When the abnormal operation of the display apparatus 100 is determined (YES in 1240), the display apparatus 100 determines whether the response action (response level) in response to the abnormal operation is a warning (operation 1250).

The controller 180 may determine a response action corresponding to the abnormal operation of the display apparatus 100 based on a response action (response level) of the rule set. For example, the controller 180 may determine a warning for the display apparatus 100 in response to an audio error according to the reset rules 550 and 570. In addition, the controller 180 may determine a warning for the display apparatus 100 in response to a connection error of the high-definition multimedia interface according to the reset rule 545.

If the response action (response level) in response to the abnormal operation is a warning (YES in 1250), the display apparatus 100 continues displaying the image and displays a warning message (operation 1260). If the response action (response level) in response to the abnormal operation is not a warning (NO in 1250), the display apparatus 100 stops displaying the image and displays an error message (operation 1270).

Operation 1260 and operation 1270 may be the same as operation 1050 and operation 1060 illustrated in FIG. 5.

As described above, the display apparatus 100 may perform self-diagnosis based on the rule set. At this time, the rule set may be changed or reset according to the operating environment of the display apparatus 100. In other words, the self-diagnosis of the display apparatus 100 reflects the operating environment of the display apparatus 100. As described above, by reflecting the operating environment of the display apparatus 100 in the self-diagnosis of the display apparatus 100, an efficient and accurate self-diagnosis of the display apparatus 100 can be provided.

Figure 10:
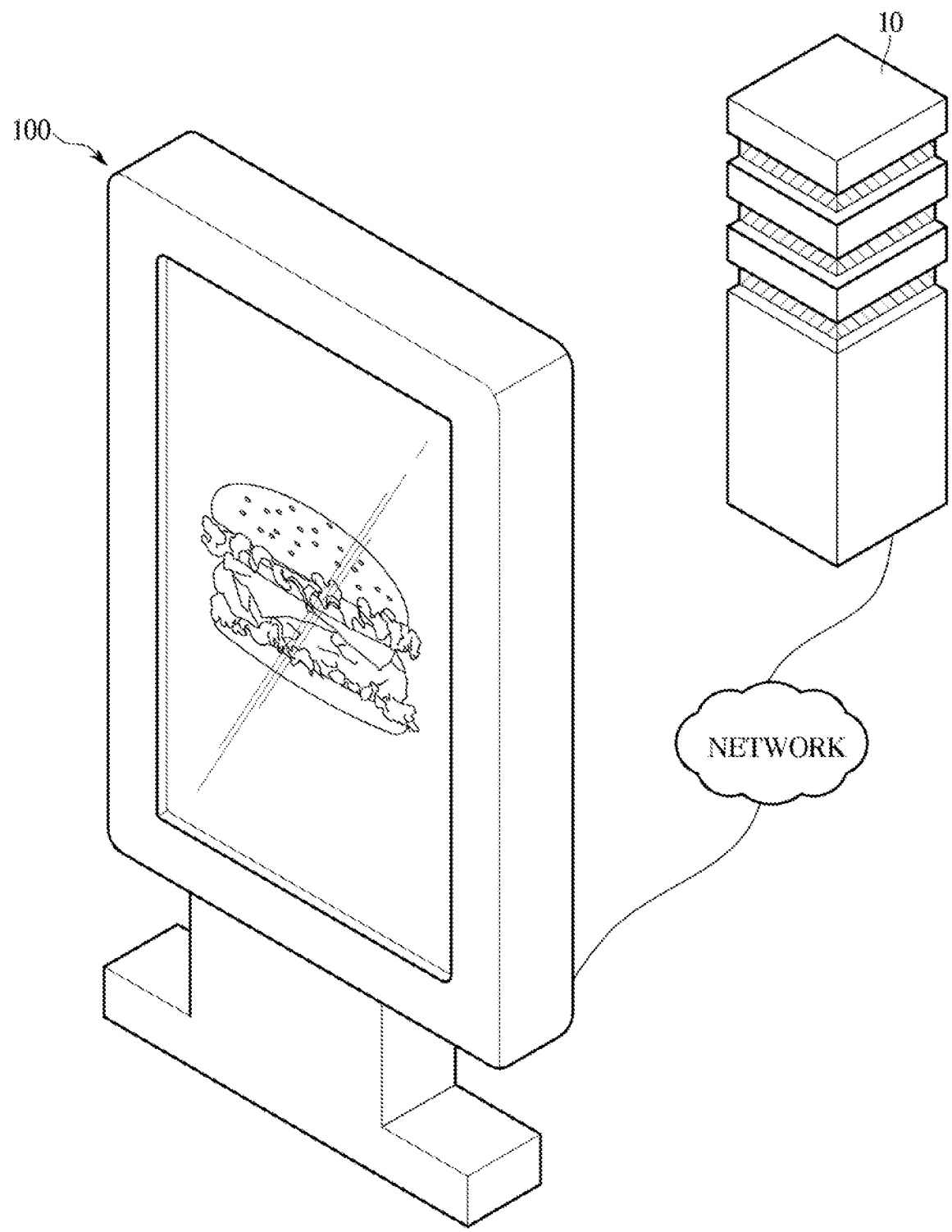
FIG. 10 illustrates a display apparatus and a server apparatus according to an embodiment.

FIG. 10 illustrates a display apparatus and a server apparatus according to an embodiment.

As shown in FIG. 10, the display apparatus 100 may be connected to a server apparatus 10 through a network.

The network may be a local area network such as Ethernet or a wide area network such as the Internet.

Although the display apparatus 100 is connected to the server apparatus 10 by wire in FIG. 10, it is not limited thereto. For example, the display apparatus 100 may be wirelessly connected to a wireless repeater (for example, a base station or access point) connected to a network. In other words, the display apparatus 100 may be connected to the server apparatus 10 through a wireless repeater and a network.

The server apparatus 10 may be a cloud server connected to a wide area network or an on-premise server connected to a local area network.

The server apparatus 10 may generate a rule set for self-diagnosis of the display apparatus 100 and transmit the generated rule set to the display apparatus 100 through a network. The server apparatus 10 may obtain the operation data, the installation environment data, and the operating environment data from the display apparatus 100. The server apparatus 10 may analyze the operation data, the installation environment data, and the operating environment data from the display apparatus 100 and update the rule set based on the analysis result.

The server apparatus 10 may transmit the generated rule set or the updated rule set to the display apparatus 100 through a network. For example, the server apparatus 10 may provide the rule set for a plurality of display apparatuses. The server apparatus 10 may provide the rule set customized for each of the plurality of display apparatuses, or a collective rule set for all of the plurality of display apparatuses.

Also, the server apparatus 10 may receive a result of self-diagnosis of the display apparatus 100. The server apparatus 10 may perform a response action in response to the self-diagnosis result of the display apparatus 100. For example, in response to an error in the display apparatus 100, the server apparatus 10 may proceed with online reception for providing customer service.

Figure 11:
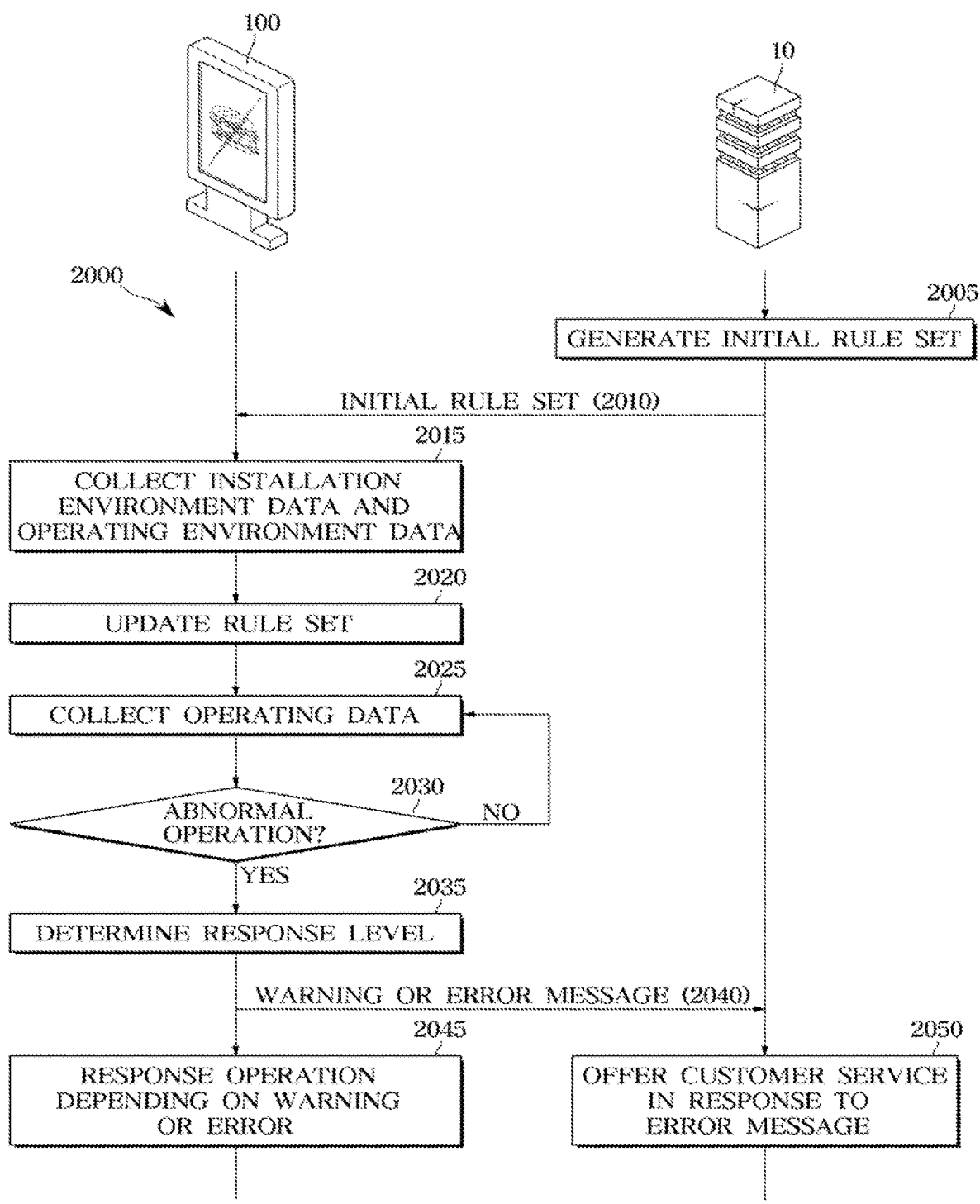
FIG. 11 illustrates an example of a diagnosis operation by collaboration between a display apparatus and a server apparatus according to an embodiment.

FIG. 11 illustrates an example of a diagnosis operation by collaboration between a display apparatus and a server apparatus according to an embodiment.

As shown in FIG. 11, diagnostic operation 2000 through collaboration between the display apparatus 100 and the server apparatus 10 is described.

The server apparatus 10 generates an initial rule set (operation 2005).

The initial rule set can be generated in advance by the manufacturer of the display apparatus 100. In addition, the initial rule set may be updated based on the operation data previously collected for the display apparatus 100.

The server apparatus 10 transmits the initial rule set to the display apparatus 100 (operation 2010).

The server apparatus 10 may transmit the initial rule set to the display apparatus 100 through the network, and the display apparatus 100 may receive the initial rule set from the server apparatus 10.

The display apparatus 100 collects the installation environment data and the operating environment data (operation 2015).

The display apparatus 100 may collect the installation environment data and the operating environment data during the operation based on the output of the user input 110, the content receiver 120, the detector 130, the sound output 140, the display 150, the communicator 160, the storage 170 and the controller 180. For example, the display apparatus 100 may obtain information about the installation country, information about the installation location, information about the indoor or outdoor installation, and information about the external temperature and external humidity. In addition, the display apparatus 100 may collect the operating time of the display apparatus 100 and the type, attribute, and reception path of content output by the display apparatus 100.

The display apparatus 100 updates the rule set received from the server apparatus 10 (operation 2020).

The display apparatus 100 may update the rule set based on the installation environment data and the operating environment data.

For example, the display apparatus 100 may update the rule set, as shown in operation 1120 illustrated in FIG. 6, based on information about the installation country, information about the installation location, information about the indoor or outdoor installation, and information about the external temperature and external humidity.

Also, the display apparatus 100 may update the rule set based on the operation time of the display apparatus 100 and the type, attribute and reception path of the content output by the display apparatus 100, as shown in operation 1220 illustrated in FIG. 8.

The display apparatus 100 collects the operation data (operation 2025).

The display apparatus 100 may collect the operation data of the display apparatus 100 based on the outputs of the user input 110, the content receiver 120, the detector 130, the sound output 140, the display 150, the communicator 160, the storage 170 and the controller 180.

Operation 2025 may be the same as operation 1010 illustrated in FIG. 5.

The display apparatus 100 determines whether the abnormal operation is performed by applying the operation data to the rule set (operation 2030).

The display apparatus 100 may apply the operation data to the rules or the judgment criteria included in the rule set, and determine whether the display apparatus 100 is abnormally operated based on the determination result based on the rules or the judgment criteria.

Operation 2030 may be the same as operation 1020 and operation 1030 illustrated in FIG. 5.

If the abnormal operation of the display apparatus 100 is not determined (NO in 2030), the display apparatus 100 continues to collect the operation data.

When the abnormal operation of the display apparatus 100 is determined (YES in 2030), the display apparatus 100 determines the corresponding level in response to the abnormal operation (operation 2035).

The display apparatus 100 may determine a response action (response level) corresponding to the abnormal operation of the display apparatus 100 based on a response action (response level) of the rule set.

Operation 2035 may be the same as operation 1040 illustrated in FIG. 5.

The display apparatus 100 transmits a warning message for the display apparatus 100 or an error message of the display apparatus 100 to the server apparatus 10 (operation 2040) depending on the corresponding level (warning or error) (operation 2040).

The display apparatus 100 may transmit a message indicating a warning for the display apparatus 100 to the server apparatus 10 in response to the response level of the rule set being a warning. The display apparatus 100 may transmit the operation data (for example, internal temperature or internal humidity of the display apparatus) that causes a warning to the display apparatus 100 together with a message to the server apparatus 10.

In addition, the display apparatus 100 may transmit a message indicating the error of the display apparatus 100 to the server apparatus 10 in response to the corresponding level of the rule set being an error. The display apparatus 100 may transmit the operation data (for example, an error in graphics hardware or an error in graphics software) that causes an error of the display apparatus 100 together with a message to the server apparatus 10.

The display apparatus 100 performs the corresponding operation based on the warning or error (operation 2045).

If the response action (response level) in response to the abnormal operation is a warning, the display apparatus 100 continues displaying the image and displays a warning message for the display apparatus 100. For example, while displaying an image based on content data, the display apparatus 100 may display a warning message indicating that the display apparatus 100 needs to be checked on one side of the display panel 152.

If the response action (response level) in response to the abnormal operation is an error, the display apparatus 100 stops displaying the image and displays an error message of the display apparatus 100. For example, the display apparatus 100 may display an error message indicating that repair of the display apparatus 100 is required to the entire display panel 152 while stopping the image display by the content data.

The server apparatus 10 provides customer service based on the error of the display apparatus 100 (operation 2050).

The server apparatus 10 may receive a warning message about the display apparatus 100 or an error message of the display apparatus 100 from the display apparatus 100. In response to receiving the error message of the display apparatus 100, the server apparatus 10 may proceed with online reception to provide customer service.

As described above, the display apparatus 100 may receive the initial rule set from the server apparatus 10, and then update the rule set based on the installation environment data and the operating environment data. Thereby, the display apparatus 100 may generate a rule set optimized for the installation environment and the operating environment of the display apparatus 100.

Figure 12:
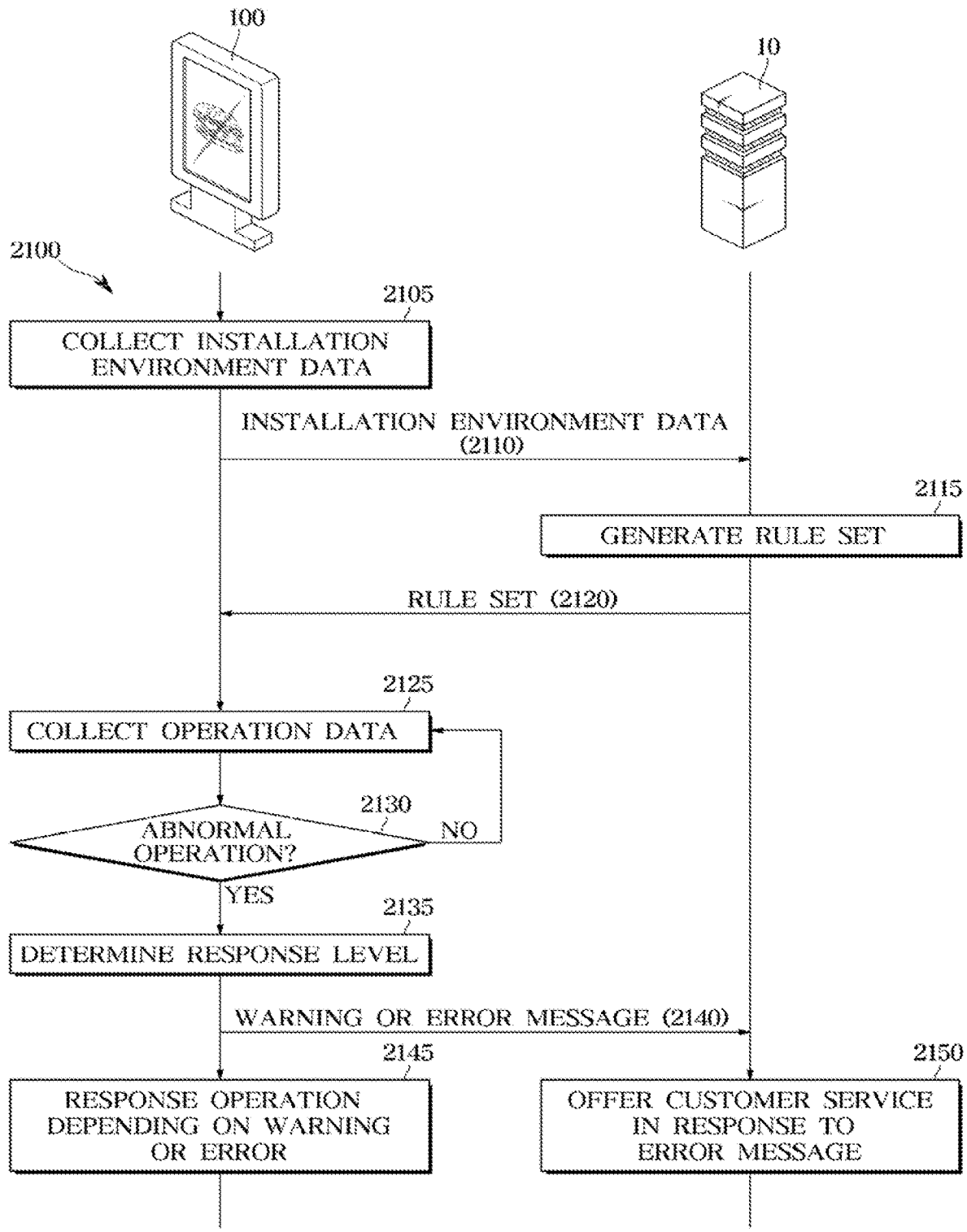
FIG. 12 illustrates an example of a diagnosis operation by collaboration between a display apparatus and a server apparatus according to an embodiment.

FIG. 12 illustrates an example of a diagnosis operation by collaboration between a display apparatus and a server apparatus according to an embodiment.

As shown in FIG. 12, diagnostic operation 2100 by the collaboration of the display apparatus 100 and the server apparatus 10 is described.

The display apparatus 100 collects the installation environment data (operation 2105).

The display apparatus 100 may collect the installation environment data during the operation based on the outputs of the user input 110, the content receiver 120, the detector 130, the sound output 140, the display 150, the communicator 160, the storage 170, and the controller 180. For example, the display apparatus 100 may obtain information about the installation country, information about the installation location, information about the indoor or outdoor installation, and information about the external temperature and external humidity.

The display apparatus 100 transmits the installation environment data to the server apparatus 10 (operation 2110).

The display apparatus 100 may transmit the installation environment data to the server apparatus 10 through a network, and the server apparatus 10 may receive the installation environment data of the display apparatus 100 from the display apparatus 100.

The server apparatus 10 generates a rule set based on the installation environment data of the display apparatus 100 (operation 2115).

The server apparatus 10 may update the initial rule set generated in advance based on the installation environment data. For example, the server apparatus 10 may update the rule set based on the installation environment data, as shown in operation 1120 illustrated in FIG. 6.

The server apparatus 10 can receive various installation environment data from the plurality of display apparatuses. In particular, the server apparatus 10 may collect the installation environment data from the display apparatuses installed in an installation environment similar to the display apparatus 100. In addition, the server apparatus 10 may collect diagnostic result data of the display apparatuses installed in the installation environment similar to the display apparatus 100. The server apparatus 10 may update the rule set based on the installation environment data and the diagnostic result data of the display apparatuses installed in the installation environment similar to the display apparatus 100.

In this way, the server apparatus 10 may generate a rule set based on the previously installed environment data and the diagnosis result data. Therefore, the server apparatus 10 can generate an optimal rule set for the installation environment of the display apparatus 100.

The server apparatus 10 transmits the rule set to the display apparatus 100 (operation 2120). Operation 2120 may be the same as operation 2010 illustrated in FIG. 11.

The display apparatus 100 collects the operation data (operation 2125) and applies the operation data to the rule set to determine whether the operation is abnormal (operation 2130). If the abnormal operation of the display apparatus 100 is determined (YES in 2130), the display apparatus 100 determines the corresponding level in response to the abnormal operation (operation 2135).

Operation 2125, operation 2130, and operation 2135 may be the same as operation 1010, operation 1020, operation 1030, and operation 1040 illustrated in FIG. 5.

The display apparatus 100 transmits a warning message for the display apparatus 100 or an error message of the display apparatus 100 to the server apparatus 10 (operation 2140), and performs the corresponding operation based on the warning or error (operation 2145) depending on the response level (warning or error). The server apparatus 10 provides customer service based on the error of the display apparatus 100 (operation 2150).

Operation 2140, operation 2145, and operation 2150 may be the same as operation 2040, operation 2045, and operation 2050 illustrated in FIG. 11.

As described above, the display apparatus 100 collects the installation environment data and transmits the collected installation environment data to the server apparatus 10. The server apparatus 10 may receive the installation environment data of not only the display apparatus 100 but also other display apparatuses, and may update the rule set based on the installation environment data received from the plurality of display apparatuses. In this way, the server apparatus 10 can generate a rule set based on the previously installed installation environment data. Therefore, the server apparatus 10 can generate an optimal rule set for the installation environment of the display apparatus 100. Thereby, the display apparatus 100 can perform self-diagnosis more accurately using the optimal rule set.

Figure 13:
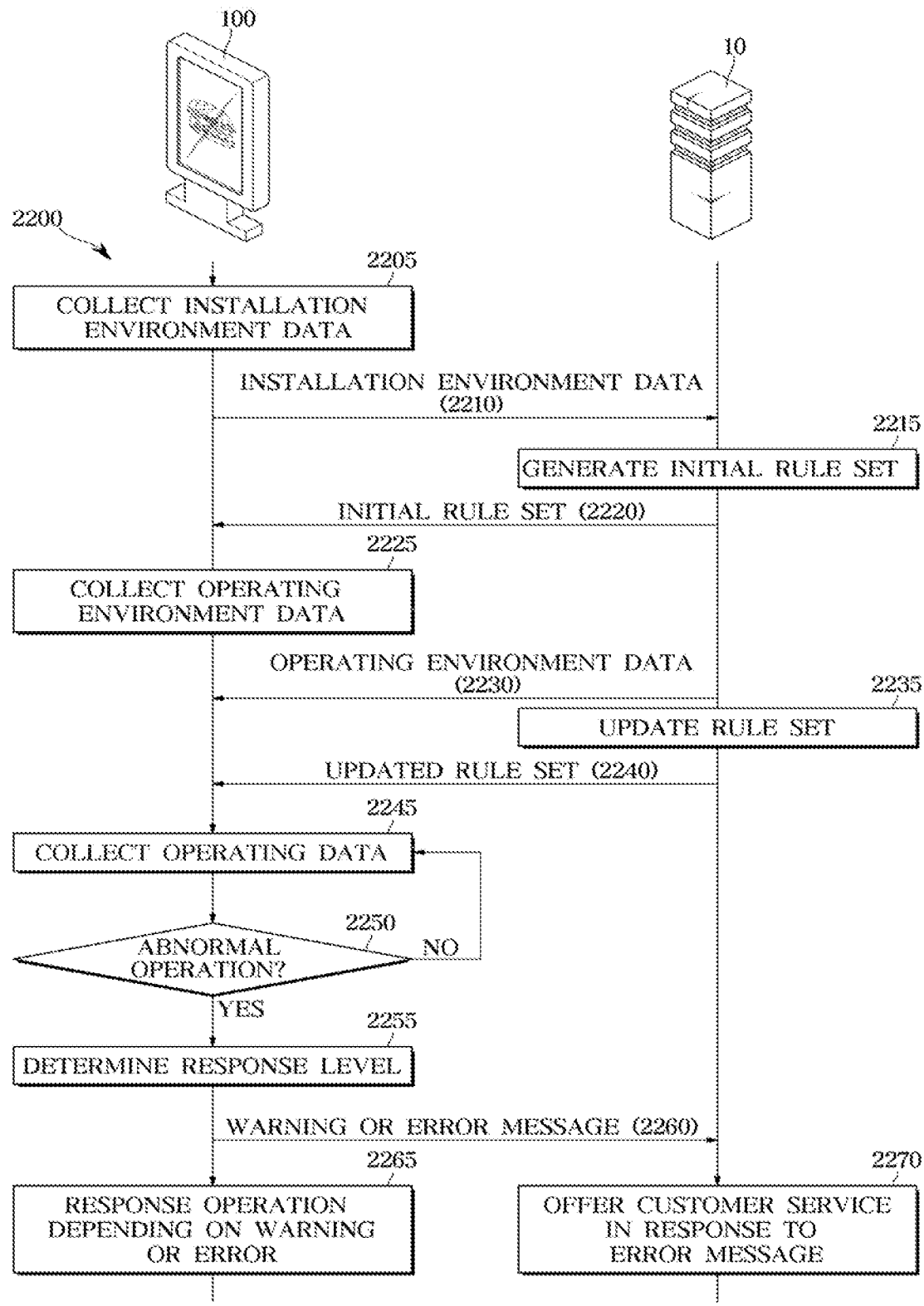
FIG. 13 illustrates an example of a diagnosis operation by collaboration between a display apparatus and a server apparatus according to an embodiment.

FIG. 13 illustrates an example of a diagnosis operation by collaboration between a display apparatus and a server apparatus according to an embodiment.

As shown in FIG. 13, diagnostic operation 2200 by collaboration between the display apparatus 100 and the server apparatus 10 is described.

The display apparatus 100 collects the installation environment data (operation 2205) and transmits the installation environment data to the server apparatus 10 (operation 2210). The server apparatus 10 generates a rule set based on the installation environment data of the display apparatus 100 (operation 2215), and transmits the rule set to the display apparatus 100 (operation 2220).

Operation 2205, operation 2210, operation 2215, and operation 2220 may be the same as operation 2105, operation 2110, operation 2115, and operation 2220 illustrated in FIG. 12.

The display apparatus 100 collects the operating environment data during the operation (operation 2225).

The display apparatus 100 may collect the operating environment data during the operation based on the output of the user input 110, the content receiver 120, the detector 130, the sound output 140, the display 150, the communicator 160, the storage 170 and the controller 180. For example, the display apparatus 100 may collect the operating time of the display apparatus 100 and the type, attribute, and reception path of content output by the display apparatus 100.

The display apparatus 100 transmits the operating environment data to the server apparatus 10 (operation 2230).

The display apparatus 100 may transmit the operating environment data to the server apparatus 10 through a network, and the server apparatus 10 may receive the operating environment data of the display apparatus 100 from the display apparatus 100.

The server apparatus 10 updates the rule set based on the operating environment data of the display apparatus 100 (operation 2235).

The server apparatus 10 may update the updated rule set based on the installation environment data of the display apparatus 100 based on the operating environment data. For example, the server apparatus 10 may update the rule set based on the operating environment data, as shown in operation 1220 illustrated in FIG. 8.

The server apparatus 10 can receive various operating environment data from the plurality of display apparatuses. In particular, the server apparatus 10 may collect the operating environment data from the display apparatuses operating in the operating environment similar to the display apparatus 100. In addition, the server apparatus 10 may collect the diagnostic result data of the display apparatuses operated in the operating environment similar to the display apparatus 100. The server apparatus 10 may update the rule set based on the operating environment data and the diagnostic result data of the display apparatuses operating in the operating environment similar to the display apparatus 100.

In this way, the server apparatus 10 can generate a rule set based on the operating environment data and the diagnostic result data accumulated in advance. Therefore, the server apparatus 10 can generate an optimal rule set for the operating environment of the display apparatus 100.

The server apparatus 10 transmits the rule set to the display apparatus 100 (operation 2240).

Operation 2240 may be the same as operation 2010 illustrated in FIG. 11. The display apparatus 100 collects the operation data (operation 2245) and applies the operation data to the rule set to determine whether it is abnormal (operation 2250). If the abnormal operation of the display apparatus 100 is determined (YES in 2250), the display apparatus 100 determines the corresponding level in response to the abnormal operation (operation 2255).

Operation 2245, operation 2250, and operation 2255 may be the same as operation 1010, operation 1020, operation 1030, and operation 1040 illustrated in FIG. 5.

The display apparatus 100 transmits a warning message for the display apparatus 100 or an error message of the display apparatus 100 to the server apparatus 10 (operation 2260) depending on the corresponding level (warning or error), and performs the corresponding operation based on the warning or error (operation 2265). The server apparatus 10 provides customer service based on the error of the display apparatus 100 (operation 2270).

Operation 2260, operation 2265, and operation 2270 may be the same as operation 2040, operation 2045, and operation 2050 illustrated in FIG. 11.

As described above, the display apparatus 100 collects the operating environment data and transmits the collected operating environment data to the server apparatus 10. The server apparatus 10 may receive the operating environment data of not only the display apparatus 100 but also other display apparatuses, and may update the rule set based on the operating environment data received from the plurality of display apparatuses. As such, the server apparatus 10 can generate a rule set based on the operating environment data accumulated in advance. Therefore, the server apparatus 10 can generate an optimal rule set for the operating environment of the display apparatus 100. Thereby, the display apparatus 100 can perform self-diagnosis more accurately using the optimal rule set.

Figure 14:
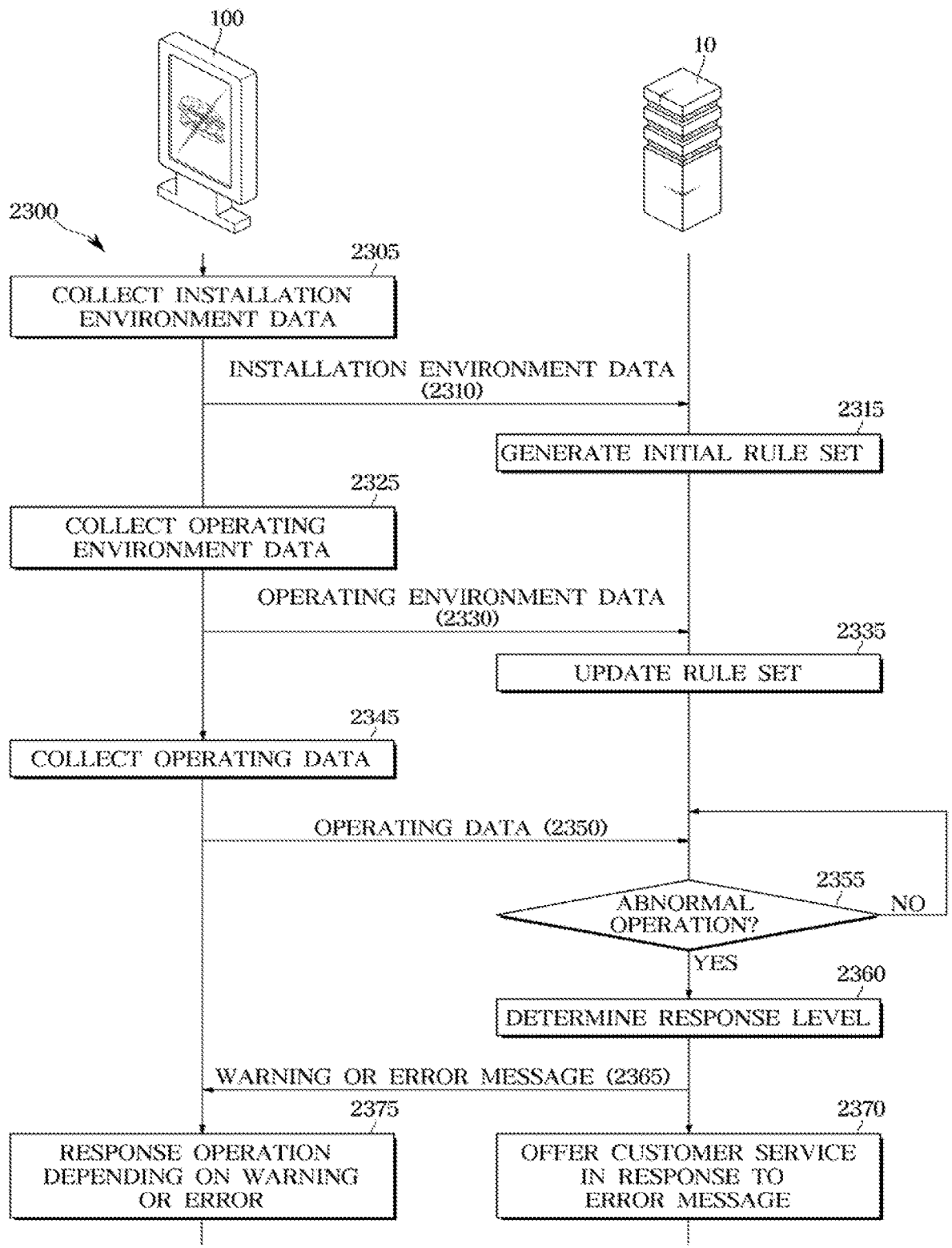
FIG. 14 illustrates an example of a diagnosis operation by collaboration between a display apparatus and a server apparatus according to an embodiment.

FIG. 14 illustrates an example of a diagnosis operation by collaboration between a display apparatus and a server apparatus according to an embodiment.

As shown in FIG. 14, diagnostic operation 2300 by the collaboration of the display apparatus 100 and the server apparatus 10 is described.

The display apparatus 100 collects the installation environment data (operation 2305), and transmits the installation environment data to the server apparatus 10 (operation 2310). The server apparatus 10 generates a rule set based on the installation environment data of the display apparatus 100 (operation 2315).

Operation 2305, operation 2310, and operation 2315 may be the same as operation 2105, operation 2110, and operation 2115 illustrated in FIG. 12.

During the operation, the display apparatus 100 collects the operating environment data (operation 2325) and transmits the operating environment data to the server apparatus 10 (operation 2330). The server apparatus 10 updates the rule set based on the operating environment data of the display apparatus 100 (operation 2335).

Operation 2325, operation 2330, and operation 2335 may be the same as operation 2225, operation 2230, and operation 2235 illustrated in FIG. 13.

The display apparatus 100 collects the operation data (operation 2345).

Operation 2345 may be the same as operation 1010 illustrated in FIG. 5.

The display apparatus 100 transmits the collected operation data to the server apparatus 10 (operation 2350).

The display apparatus 100 may transmit the operation data to the server apparatus 10 through a network, and the server apparatus 10 may receive the operation data of the display apparatus 100 from the display apparatus 100.

The server apparatus 10 determines whether an abnormal operation is performed by applying the operation data to the rule set (operation 2355).

The server apparatus 10 may apply the operation data to the rules or the judgment criteria included in the rule set, and determine whether the display apparatus 100 is abnormally operated based on the determination result based on the rules or the judgment criteria.

Operation 2355 may be the same as operation 1020 and operation 1030 illustrated in FIG. 5.

The server apparatus 10 can perform faster and more accurate calculations than the display apparatus 100. In other words, the server apparatus 10 can process more operation data than the display apparatus 100. Therefore, the server apparatus 10 can more accurately determine whether the display apparatus 100 is abnormally operated based on the operation data of the display apparatus 100.

In addition, the server apparatus 10 may receive the operation data from the plurality of display apparatuses, and may determine whether the plurality of display apparatuses are abnormally operated based on the operation data of the plurality of display apparatuses. Therefore, the operation data of the display apparatuses is accumulated in the server apparatus 10, and the server apparatus 10 can update the rule set by reflecting the accumulated operation data. Thereby, the server apparatus 10 can more accurately diagnose the display apparatus 100 using the optimal rule set.

If the abnormal operation of the display apparatus 100 is not determined (NO in 2355), the server apparatus 10 continues to receive the operation data of the display apparatus 100.

If the abnormal operation of the display apparatus 100 is determined (YES in 2355), the server apparatus 10 determines the corresponding level in response to the abnormal operation (operation 2360).

The server apparatus 10 may determine a response action (response level) corresponding to the abnormal operation of the display apparatus 100 based on a response action (response level) of the rule set.

Operation 2360 may be the same as operation 1040 illustrated in FIG. 5.

The server apparatus 10 transmits a warning message about the display apparatus 100 or an error message of the display apparatus 100 to the display apparatus 100 depending on the corresponding level (warning or error) (operation 2365).

The server apparatus 10 may transmit a message indicating a warning for the display apparatus 100 to the display apparatus 100 in response to the response level of the rule set being a warning, and may transmit a message indicating the error of the display apparatus 100 to the display apparatus 100 in response to the corresponding level of the rule set being an error.

The server apparatus 10 provides customer service based on the error of the display apparatus 100 (operation 2370). The display apparatus 100 performs the corresponding operation based on the warning or error (operation 2375).

Operation 2370 and operation 2375 may be the same as operation 2050 and operation 2045 illustrated in FIG. 11.

As described above, the display apparatus 100 transmits the installation environment data and the operating environment data to the server apparatus 10, and the server apparatus 10 may update the rule set based on the installation environment data and the operating environment data of the display apparatus 100. In addition, the display apparatus 100 transmits the operation data to the server apparatus 10, and the server apparatus 10 may determine the abnormal operation of the display apparatus 100 based on the operation data of the display apparatus 100. In the server apparatus 10, the operation data of the display apparatuses is accumulated. The server apparatus 10 may update the rule set by reflecting the accumulated operation data. Thereby, the server apparatus 10 can more accurately diagnose the display apparatus 100 using the optimal rule set.

Embodiments may be implemented as software containing one or more instructions that are stored in machine-readable (e.g., computer-readable) storage medium (e.g., internal memory or external memory). A processor may call instructions from a storage medium and is operable in accordance with the called instructions, including an electronic apparatus. When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

The computer-readable recording medium includes all kinds of recording media storing instructions that can be read by a computer. For example, there may be read only memory (ROM), random access memory (RAM), a magnetic tape, a magnetic disk, flash memory, and an optical data storage device.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus comprising:
   at least one component;
   a storage configured to store at least one rule to diagnose the at least one component;
   a content receiver;
   a display panel configured to display content received by the content receiver; and
   a controller configured to:
      acquire operation data of the at least one component,
      output at least one of a warning related to the at least one component or an error related to the at least one component, based on a result of applying the operation data to the at least one rule,
      acquire at least one of installation environment data of the display apparatus or operating environment data of the display apparatus, and
      update the at least one rule based on the at least one of the installation environment data or the operating environment data,
   wherein the controller is further configured to:
      display a warning message on the display panel while continuing to display the content, based on the warning related to the at least one component being output, and
      stop the displaying the content and display an error message on the display panel, based on the error related to the at least one component being output,
   wherein the at least one component is included in the content receiver or is a different component of the display apparatus.

2. The display apparatus of claim 1, wherein the installation environment data includes at least one of information on an installation country of the display apparatus, information on an indoor installation of the display apparatus or an outdoor installation of the display apparatus, information on an external temperature at the display apparatus, or information on an external humidity at the display apparatus.

3. The display apparatus of claim 1, wherein the operating environment data includes at least one of a total operating time of the display apparatus, an average continuous operating time of the display apparatus, a type of content output by the display apparatus, an attribute of content output by the display apparatus, or a reception path of content output by the display apparatus.

4. The display apparatus of claim 1, wherein the at least one rule includes at least one of rules for errors in content reception of the display apparatus, rules for an internal temperature of the display apparatus, rules for an internal humidity of the display apparatus, rules for video display errors, or rules for sound output errors.

5. The display apparatus of claim 1, wherein the controller is further configured to:
   output a warning for the display apparatus based on an internal temperature of the display apparatus exceeding a first threshold temperature, and
   output an error of the display apparatus based on the internal temperature of the display apparatus exceeding a second threshold temperature and an external temperature of the display apparatus exceeding a reference temperature.

6. The display apparatus of claim 1, wherein the controller is further configured to:
   output a warning for the display apparatus based on an internal humidity of the display apparatus exceeding a first threshold humidity, and
   output an error of the display apparatus based on the internal humidity of the display apparatus exceeding a second threshold humidity and an external humidity of the display apparatus exceeding a reference humidity.

7. The display apparatus of claim 1, wherein the controller is further configured to:
   output an error of the display apparatus based on an error of an audio receiving device which includes the at least one component, and
   output a warning for the display apparatus based on the error of the audio receiving device when content output by the display apparatus includes no audio signal.

8. The display apparatus of claim 1, further comprising:
   a content reception terminal configured to receive content; and
   a communicator coupled to an external device,
   wherein the controller is further configured to:
      output an error of the display apparatus based on an error of content reception by the content reception terminal which includes the at least one component, and
      based on content being received through the communicator, output a warning for the display apparatus based on an error of the content reception terminal.

9. The display apparatus of claim 1, wherein the controller is further configured to change a diagnostic cycle of the display apparatus depending on an operating time of the display apparatus.

10. The display apparatus of claim 1, wherein the installation environment data includes a type of an installation site of the display apparatus and the operating environment data includes a type of content output by the display apparatus, and
   the controller is further configured to:
      perform diagnostics of the display apparatus based on a diagnostic cycle, a frequency of which is set in advance, and
      increase the frequency of the diagnostic cycle based on at least one of the type of the installation site or the type of the content output by the display apparatus.

11. A method of controlling a display apparatus, the method comprising:
   storing at least one rule to diagnose at least one component included in the display apparatus;
   acquiring operation data of the at least one component;
   outputting at least one of a warning related to the at least one component or an error related to the at least one component, based on a result of applying the operation data to the at least one rule;
   acquiring at least one of installation environment data of the display apparatus or operating environment data of the display apparatus; and
   updating the at least one rule based on the at least one of the installation environment data or the operating environment data,
   wherein the method further comprises:
      displaying content on a display panel of the display apparatus;
      displaying, on the display panel, a warning message while continuing to display the content based on the warning for the at least one component being output; and stopping the displaying the content and displaying an error message on the display panel based on the error of the at least one component being output.

12. The method of claim 11, wherein the installation environment data includes at least one of information on an installation country of the display apparatus, information on an indoor installation of the display apparatus or an outdoor installation of the display apparatus, information on an external temperature at the display apparatus, or information on an external humidity at the display apparatus.

13. The method of claim 11, wherein the operating environment data includes at least one of a total operating time of the display apparatus, an average continuous operating time of the display apparatus, a type of content output by the display apparatus, an attribute of content output by the display apparatus, or a reception path of content output by the display apparatus.

14. The method of claim 11, wherein the at least one rule includes at least one of rules for errors in content reception of the display apparatus, rules for an internal temperature of the display apparatus, rules for an internal humidity of the display apparatus, rules for video display errors, or rules for sound output errors.

15. A display system comprising:
a server apparatus configured to store at least one rule; and
a display apparatus comprising a display panel and configured to:
receive the at least one rule from the server apparatus, and
output at least one of a warning related to at least one component of the display apparatus or an error related to the at least one component, based on a result of applying operation data of the display apparatus to the at least one rule,
wherein the at least one rule is updated based on at least one of installation environment data of the display apparatus or operating environment data of the display apparatus, and
wherein the display apparatus is further configured to:
display content on the display panel,
display a warning message on the display panel while continuing to display the content based on the warning for the at least one component being output, and
stop the displaying the content and display an error message on the display panel based on the error of the at least one component being output.

16. The display system of claim 15, wherein the display apparatus is further configured to transmit the at least one of the warning related to the at least one component or the error related to the at least one component to the server apparatus.

17. The display system of claim 15, wherein the display apparatus is further configured to update the at least one rule based on the at least one of the installation environment data or the operating environment data.

18. The display system of claim 15, wherein the display apparatus is further configured to transmit the installation environment data and the operating environment data to the server apparatus, and
the server apparatus is further configured to update the at least one rule based on the at least one of the installation environment data or the operating environment data.

* * * * *